US006339306B1

(12) United States Patent
Hara

(10) Patent No.: US 6,339,306 B1
(45) Date of Patent: *Jan. 15, 2002

(54) CONTROL DEVICE FOR STEPPER MOTOR, CONTROL METHOD FOR THE SAME, AND TIMING DEVICE

(75) Inventor: Tatsuo Hara, Suwa (JP)

(73) Assignee: Seiko Epson Corporation, Nagano-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/604,623

(22) Filed: Jun. 27, 2000

Related U.S. Application Data

(63) Continuation of application No. 09/020,223, filed on Feb. 6, 1998, now Pat. No. 6,194,862.

(30) Foreign Application Priority Data

Feb. 7, 1997 (JP) .............................................. 9-25677

(51) Int. Cl.[7] ............................ H02K 29/04; G04F 5/00

(52) U.S. Cl. ......................... 318/696; 318/685; 368/76; 368/157

(58) Field of Search ................................ 318/560–696; 368/64, 66, 151, 204, 205

(56) References Cited

U.S. PATENT DOCUMENTS 5,889,734 A * 3/1999 Sato ............................ 368/64

* cited by examiner

*Primary Examiner*—Paul Ip
(74) *Attorney, Agent, or Firm*—Stroock & Stroock & Lavan LLP

(57) ABSTRACT

A control device for stepping motor including a driving pulse supplying unit for supplying a plurality of driving pulses to a driving coil for driving a rotor. A rotation detecting pulse supplying unit supplies rotation detection pulses for detecting whether the rotor rotated. A magnetic field pulse supplying unit supplies a plurality of magnetic field detection pulses for detecting the presence of magnetic field external to said stepping motor. A detection unit determines whether the driving rotor rotated and whether a magnetic field is present. An auxiliary pulse supplying unit supplies an auxiliary pulse when either rotor was not detected or when said an external magnetic field was detected. Before the driving pulse, is output, two said magnetic field detecting means magnetic field detecting pulses having different polarities are output.

54 Claims, 14 Drawing Sheets

CONTROL DEVICE FOR STEPPER MOTOR, CONTROL METHOD FOR THE SAME, AND TIMING DEVICE

This application is a continuation of application Ser. No. 09/020,223, filed Feb. 6, 1998, U.S. Pat. No. 6,194,862.

BACKGROUND OF INVENTION

The present invention relates to a control device for an electronic timepiece, and in particular to a control device for controlling a stepping motor used in an electronic timepiece which uses kinetic energy to drive a electricity generating device to provide electronic power for driving the stepping motor.

In recent years, timing devices, such as wrist-watches, have been sold with built-in electricity generators in which the energy generated by the movement of the user's arm is converted into electricity which is used to drive the stepping motor which moves the hands of the device. These timing devices operate without batteries and can continuously run off the energy generated by the user's movement. Also, these timing devices eliminate the often cumbersome process of changing batteries as well as help reduce the environmental hazard associated with battery disposal. As a result, built-in electricity generators are being closely evaluated for future widespread use in wristwatches and similar devices.

Generally, electronic timepieces that incorporate electricity generators include a stepping motor for driving the hands of the timepiece. These stepping motors, also referred to as a pulse motors or digital motors, are driven by pulse signals and are also extensively used as actuators for digital control devices. In recent years, compact electronic devices and information equipment have been developed in which portability is desirable, and compact and lightweight stepping motors are in widespread use as actuators for this equipment. Representative of such electronic devices are timing devices including electronic timepieces, time switches and chronographs.

Referring now to FIG. 12, there is shown a prior art timing device 9, for example a wristwatch, which includes a stepping motor 10, a driving circuit 30 for driving stepping motor 10, a gear train 50 for transferring the force of stepping motor 10, a second hand 61, a minute hand 62, and an hour hand 63 which are moved by gear train 50. Stepping motor 10 generates magnetic force in response to driving pulses supplied from a control device 20. Stepping motor 10 includes a driving coil 11, a stator 12 which is excited by driving coil 11, and a rotor 13 which rotates within stator 12 as a result of the excited magnetic field. By selecting a disk-shaped bipolar permanent magnet for rotor 13, a PM-type (Permanent Magnet rotational) stepping motor is formed. Stator 12 is provided with a magnetism saturating unit 17 so that the different magnetic poles that result from the magnetic force generated by driving coil 11 are generated at the phases (poles) 15 and 16, respectively surrounding rotor 13. Also, an internal notching 18 is provided at the appropriate location on the inner periphery of stator 12 so that cogging torque is generated and rotor 13 is stopped at the appropriate position.

The rotation of rotor 13 of stepping motor 10 is transferred to each of the timepiece hands by gear train 50 which includes a fifth gear 51 meshing with a fourth gear 52, which also meshes with a third gear 53, which meshes with a center wheel 54. Center wheel 54 meshes with a minute wheel 55, which meshes with an hour wheel 56. Second hand 61 is connected to the axis of fourth gear 52, minute hand 62 is connected to the axis of center wheel 54, and hour hand 63 is connected to the axis of hour wheel 56. Time is displayed by each of the timepiece hands operating synchronously with the rotation of rotor 13. Of course, a transfer system for displaying the year, month, and day (not shown) may also be connected to gear train 50. In order for timing device 9 to display the time as a result of the rotation of stepping motor 10, stepping motor 10 is supplied with driving pulses which are based on counting (timing) of signals generated by a reference frequency.

Control device 20, which controls stepping motor 10, includes a pulse synthesizing circuit 22 for generating reference pulses of a standard frequency using a reference oscillator 21 such as a crystal oscillator, or pulse signals of a different pulse width or timing. The reference pulses are input to a control circuit 23 for controlling stepping motor 10 based on the various pulse signals supplied from pulse synthesizing circuit 22. Control circuit 23 has a driving control circuit 24 which receives the reference pulses for controlling driving circuit 30, and a detecting circuit 25 for detecting whether driving rotor 13 rotated. Driving control circuit 24 includes: a driving pulse supplying unit **24*a* for supplying driving pulses to driving circuit 30 which in turn drives driving rotor 13 of stepping motor 10; a rotation detection pulse supplying unit 24*b* for outputting rotation detecting pulses to detection circuit 25 for inducing induction voltage to determine whether driving rotor 13 rotated in response to the driving pulse; a magnetic detection pulse supplying unit 24*c* for outputting magnetic field detecting pulses to detection circuit 25 prior to the output of the driving pulse, for inducing induction voltage to detect the presence of a magnetic field external to stepping motor 10; an auxiliary pulse supplying unit 24*d* for generating an auxiliary pulse that has an effective electric power that is greater than that of the driving pulse, the auxiliary pulse being output if the driving pulse does not cause driving rotor 13 to rotate or if an external magnetic field has been detected; and a demagnetizing pulse supplying unit 24*e* for producing a demagnetizing pulse having a polarity that is opposite that of the auxiliary pulse and which is used to demagnetize driving coil 11** after the auxiliary pulse is output.

Detecting circuit 25 includes a rotating detecting unit 26 for comparing the rotation detecting induction voltage, obtained by outputting the rotation detecting pulse, with a set value, and detecting whether driving rotor 13 rotated. Detecting circuit 25 also includes a magnetic field detecting unit 27 for comparing the magnetic field detecting induction voltage, obtained by outputting the magnetic field detecting pulse, with a set value for detecting the presence of a magnetic field.

Referring now to FIG. 13, there is shown rotation detecting unit 26 which employs a pair of comparators, **29*a* and 29*b*, to compare the value of the bi-directional excitation voltage generated in driving coil 11 with a set value SV1, to determine whether driving rotor 13 has rotated. Comparator 29*a* receives one input from the standard signal SV1 and a second input $\phi$1 from one side of driving coil 11 and produces a first comparison signal. Similarly, comparator 29*b* receives a first input SV1 and a second input $\phi$2 from the other side of driving coil 11 and produces a second comparison signal. An OR gate 29*c* receives the first and second comparison signals and produces an output to driving control circuit 24. Similarly, magnetic field detecting unit 27 uses a pair of inverters, 28*a* and 28*b*, each having a threshold value of SV2, which receive the inputs of $\phi$1 and $\phi$2**, respectively. These inverted signals are input to an OR gate 28*c* for detecting the presence of a magnetic field. The results of each comparison are fed back to driving control circuit 24, and are used for controlling stepping motor 10.

Driving circuit 30, which supplies various driving pulses to stepping motor 10 under the control of driving control circuit 24, coupled between driving control circuit 24 and a battery 41, has a bridge circuit which includes a serially connected p-channel MOSFET 33*a* and n-channel MOSFET 32*b*, and serially connected p-channel MOSFET 33*b* and n-channel MOSFET 32*a*, configured for controlling the voltage supplied to stepping motor 10 from battery 41. Also included are a pair of rotation detecting resistors 35*a* and 35*b* connected in parallel to the p-channel MOSFET 33*a* and 33*b*, respectively, and a pair of sampling p-channel MOSFET, 34*a* and 34*b*, coupled between ground, driving circuit 24 and resistors 35*a*, 35*b* respectively for supplying chopper pulses to resistors 34*a* and 35*b*. Control pulses having different polarities and pulse widths are output from supplying unit 24*a* through 24*e* of driving control circuit 24 to the gate electrodes of each of MOSFET 32*a*, 32*b*, 33*a*, 33*b*, 34*a* and 34*b* according to the respective timings. Thus, driving pulses having different polarities drive driving coil 11 and pulses for inducing induction voltage for rotation detection of rotor 13 and magnetic field detection are supplied.

Referring now to FIG. 14, there is shown a timing chart illustrating the control signals supplied to gates GP1, GN1, and GS1 of the p-channel MOSFET 33*a*, n-channel MOSFET 32*a*, and sampling p-channel MOSFET 34*a*, respectively, for excitation of a magnetic field of one polarity across driving coil 11, and to gates GP2, GN2 and GS2 of the p-channel MOSFET 33*b*, n-channel MOSFET 32*b*, and sampling p-channel MOSFET 34*b*, respectively, for excitation of a magnetic field of a reverse polarity across driving coil 11. Control device 20 controls the movement of the timepiece hands each second, by supplying a series of control pulses to driving circuit 30 which in turn controls stepping motor 10. At the beginning of a timing cycle, pulses SP0 and SP1 are output from driving control circuit 24 for detecting whether a magnetic field is present which causes rotation detection to be unreliable. Pulse SP0, which is output at the time t1, is used for detecting the presence of a magnetic field due to high-frequency noise. The control signals for outputting magnetic field detecting pulse SP0 are supplied by magnetic field detecting pulse supplying unit 24*c* to gate GP1 of the p-channel MOSFET 33*a* on the driving side (driving pole side) i.e. the side of driving circuit 30 from which driving pulse P1 is output. Magnetic field detecting pulse SP0 is a continuous control pulse having a pulse width of approximately 20 ms and is used to detect magnetic noise caused by, for example, the switching of household electrical appliances such as electric blankets or infrared foot-warmer tables. After pulse SP0 is output, a control signal for outputting a magnetic field detecting pulse SP1 for detecting alternating current magnetic fields of 50 to 60 Hz is output at time t2 by magnetic detecting pulse supplying unit 24*c* to gate GP2 of p-channel MOSFET 33*b* on the side that is opposite to the driving pole side (i.e. reverse pole). Magnetic field detecting pulse SP1 is an intermittent chopper pulse having a duty ratio of approximately ⅛, and samples the electric current induced in driving coil 11 by the alternating current magnetic field thus enabling magnetic field detection unit 27 of detecting circuit 25 to detect the presence of a magnetic field. Also, because the magnetic field detecting capabilities of the driving side, i.e., the p-channel MOSFET 33*a* and the n-channel MOSFET 32*a*, deteriorates after an auxiliary pulse is applied, control pulse SP1 is output to gate GP2 of p-channel MOSFET 33*b* which is at the opposite pole of the driving side (reverse pole). Such magnetic field detection is disclosed in detail in Japanese Examined Patent Publication No. 3-45798.

After magnetic field detecting pulses SP0 and SP1 are output, control pulses for outputting driving pulse P1 at time t3 is supplied by driving pulse supplying unit 24*a* to gate GN1 of the n-channel MOSFET 32*a* and gate GP1 of the p-channel MOSFET 33*a* of the driving pole side. The effective electric power of the driving pulse P1 is reduced to approximately the limit of rotation of driving rotor 13, and is selected such that driving pulse P1 has pulse width of, e.g. W10. The control signal for outputting driving pulse P1 can vary the pulse width of driving pulse P1 thereby controlling the effective electric power of driving pulse P1. If driving rotor 13 does not rotate in response to driving pulse P1 and it is therefore necessary to output auxiliary pulse P2 to rotate driving rotor 13, the pulse width of driving pulse P1 is widened thereby increasing its effective electric power. On the other hand, if rotor 13 is continuously driven for a predetermined number of times by driving pulses P1 having the same pulse width, the effective electric power of driving pulse P1 can be reduced by narrowing its pulse width.

After driving pulse P1 is output, rotation detection pulse supplying unit 24*b* outputs a rotation detection pulse SP2 to gate GP1 of the p-channel MOSFET 33*a* on the driving side and to sampling p-channel MOSFET 34*a* at time t4 for detecting whether rotor 13 rotated. Rotation detecting pulse SP2 is a chopper pulse with a duty ration having approximately ½, and causes the induction electric current induced in driving coil when rotor 13 rotates to be output to rotation detecting resister 35*a*. The voltage across rotation detecting resister 35*a* is compared by rotation detecting unit 26 of detecting circuit 25 with a set value SV1 for determining whether driving rotor 13 has rotated.

If the induction voltage induced by rotation detecting pulse SP2 is not at least set value SV1, it is determined that rotor 13 did not rotate, and a control signal for outputting auxiliary pulse P2 at time t5 is output from auxiliary pulse supplying unit 24*d* to gate GP1 of n-channel MOSFET 32*a* on the driving side and also to gate GP1 of p-channel MOSFET 33*a*. Auxiliary pulse P2 has a width of W20 and has a greater effective electric power than driving pulse P1. Thus, auxiliary pulse P2 has sufficient energy to ensure that rotor 13 rotates. Auxiliary pulse P2 is output instead of driving pulse P1 when the rotation of rotor 13 is not detected and when a magnetic field is detected by either of magnetic field detecting pulses SP0 and SP1. If a magnetic noise is present in the area of stepping motor 10, it is possible that rotation detecting pulse SP2 falsely detects the rotation of rotor 13 thereby causing errors in the movement of the timepiece hands. Accordingly, if a magnetic field is detected, an unnecessary auxiliary pulse P2 is output for detecting rotation, which while increasing power consumption, will prevent errors in the movement of the timepiece hands.

If auxiliary pulse P2 is output, a control pulse for outputting a demagnetizing pulse PE at time t6 is supplied by the demagnetizing pulse supplying unit 24*e* to gate GN2 of n-channel MOSFET 32*b*, which is at the reverse pole, and to gate GP2 of the p-channel MOSFET 33*b*. Demagnetizing pulse PE, a pulse which is of reverse polarity to auxiliary pulse P2, reduces the residual magnetic flux of driving coil 11 which is generated by the high effective electric power of auxiliary pulse P2. After demagnetizing pulse PE is output, one cycle of the rotational driving of stepping motor 10 by one step angle is completed.

One second after time t1, the next cycle of rotational driving of stepping motor 10 by one step angle starts at t11. In this cycle, MOSFET 32*b*, 33*b*, and 34*b* which were on the reverse side in the previous cycle now become the driving pole side. As with the previous cycle, pulse SP0 is first output at time t11 for detecting magnetic flux noise due to high-frequency noise, and then pulse SP1 is output at time t12 for detecting noise due to a low-frequency alternating current magnetic field. If magnetic noise is not detected, driving pulse P1 is output at time t13. Because auxiliary pulse P2 has been output in the previous cycle, the effective electric power of driving pulse P1 is increased, and a driving pulse P1 a width W11 (where W11>W10) is output at time t13. Next, rotation detecting pulse SP2 is output at time t14, and if rotation of rotor 13 is detected, the cycle ends.

Referring now to FIG. 15, there is shown a flow chart of the above-described operation of control device 20. First, in step ST1, a timing reference pulse is counted and a one second time duration is measured. If it is determined that one second elapses, then in step ST2, a high-frequency magnetic field is detected using magnetic field detecting pulse SP0. If a high-frequency magnetic field is detected, then, in step ST7, auxiliary pulse P2 having a greater effective electric power than driving pulse P1 is output instead of the driving pulse P1, thus preventing errors in the movement of the timepiece hands from occurring due to unreliable rotation detection. If a high-frequency magnetic field is not detected, in step ST3, the presence of an alternating current magnetic field of a low-frequency is detected in steps using magnetic field detecting pulse SP1. If an alternating current magnetic field is present, then in step ST7, auxiliary pulse P2 is output thus preventing errors in the movement of the timepiece hands from occurring.

If no magnetic field is detected in any steps ST2, ST3, then in step ST4, driving pulse P1 is output and, in step ST5 it is determined whether rotor 13 has rotated by output of rotation detecting pulse SP2. If the rotation of rotor 13 is not confirmed, then in step ST7, auxiliary pulse P2 having a greater effective electric power than driving pulse P1 is output thereby ensuring that rotor 13 is rotated. After auxiliary pulse P2 is output, in step ST8, demagnetizing pulse PE is output, and in step ST10, the level of driving pulse P1 is adjusted higher (first level adjustment). If rotation was not confirmed in step ST5, using driving pulse P1 with the same effective electric power will result in the defective rotation being repeated. Accordingly, in step ST11, the cause for the defective rotation which made the output of auxiliary pulse P2 necessary is determined and, in step ST12, the output of driving pulse P1 is set to a higher voltage level to avoid repeated defective rotation in the next cycles. The system then returns to step ST1.

If, in step ST5, the rotation of rotor 13 as a result of driving pulse P1 was detected, the effective electric power of driving pulse P1 is adjusted lower in step ST6 (second level adjustment). In many cases, the effective electric power of driving pulse P1 is reduced after it is confirmed several times that rotor 13 has rotated in response to driving pulse P1. By performing such control, the power consumption of pulse P1 is reduced, and error in the movement of the timepiece hands is prevented from occurring in areas where there are magnetic fields from electric and electronic appliances. Accordingly, a timing device with high reliability and low power consumption is realized.

When an electricity generating device, which converts energy from the movement of the user into electricity, is added to the timepiece, another generator that has a similar configuration as that of stepping motor 10 is introduced. The electricity generating device includes a generating rotor that rotates within a stator, the generating rotor rotates by way of an energy transferring device, such as a rotating weight, thereby changing kinetic energy into rotational energy.

However, the magnetic flux generated by the generator also generates noise that may interfere with the rotation detection of driving rotor 13 thereby lowering the reliability and accuracy of timing device 9. The noise from the generator has a frequency approximately in the range of 200 to 300 Hz and is not easily detected by magnetic field detecting pulse SP0, which is normally designed to detect high frequency noise, or magnetic field detecting pulse SP1, which is used to detect alternating magnetic flux in the 50 to 60 Hz. Furthermore, the generator only generates electricity when the rotating weight rotates due to the user's arm movement. Accordingly, the magnetic field generated by the generator is irregular, and often only e.g., 100 ms. Therefore, it is likely that this noise may be generated at the same time that rotation detecting pulse SP2 is being output even if pulse SP0 or pulse SP1 did not previously detect the presence of magnetic flux. Also, because half-wave rectification, which requires minimal space and is inexpensive to implement, is generally used in electronic timepieces, the magnetic noise is directional. Thus, there is no guarantee that when using the conventional detection system, the presence of magnetic noise will not cause the rotation of rotor 13 to be falsely detected. Furthermore, even if magnetic noise is detected and auxiliary pulse P2, having a greater effective electric power, is output, the magnetic detection capabilities in the same direction will deteriorate due to effects of residual magnetism.

Thus, in order to achieve a highly reliable timing device, it is necessary that control devices for stepping motors built in to timing devices along with alternating current electricity generating devices be provided so that the magnetic field generated by the generating device can be eliminated.

SUMMARY OF THE INVENTION

A control device that compensates for external magnetic fields, including magnetic fields generated by an on board electricity generating device, is provided. In order to inhibit effects of the magnetic field generated by the electricity generating device as much as possible, the detection of the alternating current magnetic field is performed not only at the reverse pole side to the driving pole side, but is also performed at the driving pole side, in order to increase the likelihood of detection of the magnetic field.

The present invention includes a control device for a stepping motor. The stepping motor includes a driving rotor that is rotatably driveable within a driving stator that includes a driving coil. The driving rotor is subjected to multipolar magnetization by electric power which is supplied via a condenser. The electric power is generated by an electricity generating device which includes an electricity generating rotor rotating within an electricity generating stator. The electricity generating device is driven by a kinetic energy transferring apparatus.

The control device includes a driving circuit for supplying driving pulses to the driving coil for driving the driving rotor. A rotation detecting pulse supplying unit supplies rotation detection pulses following the driving pulse for inducing induction voltage to detect the rotation of the driving rotor. A magnetic detection pulse supplying unit supplies magnetic field detection pulses prior to the driving pulse for inducing a magnetic field detecting induction voltage to detect the presence of a magnetic field external to the stepping motor. A detection circuit compares the rotation detecting induction voltage and magnetic field detecting induction voltage obtained by the rotation detecting pulse and magnetic field detecting pulse, respectively, with respective set values, thus detecting whether rotation of the driving rotor occurred and the presence of a magnetic field. An auxiliary pulse supplying unit supplies an auxiliary pulse of effective electric power that is greater than the driving pulse if either the driving rotor does not rotate in response to the driving pulse or when the external magnetic field has been detected. The magnetic detection pulse supplying unit supplies to the driving coil, prior to the driving pulse, a first magnetic field detection pulse and a second magnetic field detecting pulse each of different polarity for detecting magnetic fields of approximately the same frequency band.

The present invention also includes a method for controlling a stepping motor in which a driving rotor is rotatably driveable within a driving stator having a driving coil, the driving rotor having been subjected to multipolar magnetization by electric power which is stored in a condenser, the electric power being generated by an electricity generating device which includes an electricity generating rotor that rotates within an electricity generating stator, the electricity generating device being driven by a kinetic energy transferring apparatus. The control method includes a driving step in which driving pulses are supplied to the driving coil for driving the driving rotor. In a rotation detecting step, driving coil rotation detection pulses are output following the driving pulse and the induced induction voltage is compared with a first set value for detecting whether rotation occurred. In a magnetic field detecting step, magnetic field detection pulses are output to the driving coil prior to the driving pulse and the induced induction voltage is compared with a second set value for detecting the presence of a magnetic field external to the stepping motor. Magnetic field detecting pulses of different polarities are output to the driving coil in order to detect magnetic fields of approximately the same frequency band. In an auxiliary pulse supplying step, an auxiliary pulse of effective electric power greater than that of the driving pulse is supplied in the event that the driving rotor does not rotate in response to the driving pulse or when an external magnetic field has been detected.

By detecting alternating current magnetic flux on the pole opposite to the driving pole side (reverse pole) in addition to the driving pole side, there is a greater possibility that the presence of a magnetic field will be detected, even in cases where the magnetic field is being generated by the electricity generator which primarily effects the driving side of the driving coil. In conventional systems, detection of the alternating current magnetic fields on the driving side is not performed. This gives rise to the danger that a magnetic field may be present on the driving side which would result in false positive rotation detection and lead to error in the movement of the timepiece hands. However, in the present invention, the probability of detecting magnetic fields is improved by performing the detection of alternating current magnetic fields on the driving side as well as on the reverse pole side because magnetic fields may then be detected at both poles and also, the detection time is doubled. This greatly improves the reliability of timing devices especially for those that include an electricity generating device because magnetic fields can be detected with a high degree of sensitivity.

Also, considering the fact that the magnetic field generated by the electricity generating device is irregular and often as short as 100 ms in duration, it is impossible to determine at what point during the driving cycle of the stepper motor the magnetic fields will be introduced. Accordingly, it is also advantageous to supply magnetic field detecting pulses immediately following the rotation detecting pulse to determine the accuracy of the rotation detection and whether the rotation detection may have been influenced by magnetic noise. Therefore, under the present invention, a control device for a stepping motor is provided which supplies a magnetic field detecting pulse to the driving coil before the driving pulse is output and also immediately following the output of the rotation detecting pulse thereby increasing the reliability of magnetic field detection. In this way, a method of controlling the stepping motor is provided which includes a first magnetic field detecting step in which magnetic field detection pulses are output to the driving coil before the driving pulse and the induced induction voltage is compared with a second set value for detecting the presence of magnetic fields external to the stepping motor. The control method of the present invention also adds a second magnetic field detecting step in which the magnetic field detection pulse is output to the driving coil following the rotation detecting pulse and the induced voltage is compared with a second set value thereby detecting the presence of a magnetic field external to the stepping motor.

Generally, electric power from the electricity generating device is supplied to the control device of the stepping motor via a capacitor or condensor. As a result, the voltage of the driving pulses and other control signals supplied to the stepping motor changes in proportion to the charging voltage stored in the condensor. As the charging voltage increases, the signal-to-noise (S/N) ratio of the driving pulse also increases which tends to reduce magnetic field detection capabilities. Thus, according to the control device and method of the present invention, the set value for detecting the presence of a magnetic field described above is made to vary with the charging voltage. In this way, the probability of detecting a magnetic field is increased by lowering the set value when the charging voltage increases so that magnetic field detection sensitivity does not deteriorate.

In a preferred embodiment, instead of trying to detect the presence of a magnetic field generated by the electricity generating device, it is determined whether electricity is being generated by the electricity generating device and, if electricity is being generated, it is assumed that a magnetic field which would effect rotation detection is present. Accordingly, in the control device of the stepping motor of this embodiment, an auxiliary pulse is supplied by the auxiliary pulse supplying unit if it is determined that the electricity generating device is generating electricity without even detecting whether a magnetic field is present. Also, although magnetic field detection capabilities are reduced when an auxiliary pulse having a greater effective electric power than the driving pulse is supplied, this is of no consequence because the determination of whether to supply an auxiliary pulse is based on whether electricity is being generated and not on the presence of a magnetic field. Accordingly, the reliability of control device of the stepping motor is further improved.

If the device has a short-pulse supplying unit for supplying short-pulses to the driving coil which have a shorter cycle than the drive pulses, for example, fast-forward pulses or reverse pulses, it is preferable that the short-pulse supplying unit stop supplying the short-pulse when electricity is being generated in order to prevent error in the movement of the timepiece hands. In particular, the voltage of the reverse pulses (which drive the rotor in the reverse direction) may fluctuate when electricity is being generated because these pulses are combinations of a plurality of short pulses which are particularly vulnerable to noise. The voltage of the fast-forward pulses may also fluctuate because these pulses also have short cycles. Accordingly, it is preferable that reverse driving as well as fast-forward pulses be forcibly terminated during electricity generation.

If a magnetic field is detected, or if the generating device is generating electricity and auxiliary pulses have been output, there is a high possibility that a residual magnetic field may remain in the driving coil which will adversely impact rotation detection. Accordingly, in a preferred embodiment, a driving pulse having a greater effective electric power than the immediately preceding diving pulse is supplied after the auxiliary pulse is output. These higher power driving pulses which will ensure rotor rotation are supplied a certain number of times following the output of the auxiliary pulse. In this way, the need to detect whether or not rotation occurred is eliminated in this situation and error in the movement of the timepiece hands can be prevented. The effective electric power of these driving pulses can be adjusted by either varying the pulse width or voltage. In addition, by supplying a demagnetizing pulse having a different polarity than that of the auxiliary pulse for demagnetizing the driving coil following the output of the auxiliary pulse and immediately before the next driving pulse, a substantial increase in the effective voltage of the driving pulse is achieved.

As described above, a control device and a method for controlling a stepping motor is provided in which the effects of the magnetic field generated by the electricity generating device stored within the device is minimized. This result is accomplished in several ways including, but not limited to: improving the probability of detection of the magnetic field; assuming the presence of a magnetic field if the electricity generating device is generating electricity instead of trying to detect the presence of magnetic fields; and supplying a driving pulse having greater effective electric power than the previous driving pulse following the auxiliary pulse. Thus, by using a control device according to the present invention, a stepping motor that can perform movement of the timepiece hands in a stable manner and with high reliability is provided. Also, by constructing a timepiece which includes a stepping motor control device according to the present invention, a stepping motor which moves the hands on the face of the timepiece using driving pulses, a pulse synthesizing unit which outputs pulse signals of a plurality of frequencies, and an electricity generating device capable of supplying the necessary electrical power, a highly precise timepiece can be provided which may be used anytime and anywhere without the use of batteries.

Furthermore, the method of controlling a stepping motor according to the present invention can be implemented in a computer-readable medium such as in the control program of a logic circuit or a microprocessor, and is therefore not restricted to timing devices and can also be applied to various motor devices which require intermittent and highly precise hand movements.

Accordingly, it is an object of the present invention to provide a control device for controlling a stepping motor for use in a timepiece together with an alternating current electricity generating device in which the effects of external magnetic fields and, in particular, the magnetic field generated by the generating device are eliminated thereby providing a highly reliable timepiece.

It is another object of the present invention to provide a highly precise timing device with a built in electricity generating device so that the need to replace and discard batteries is eliminated.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
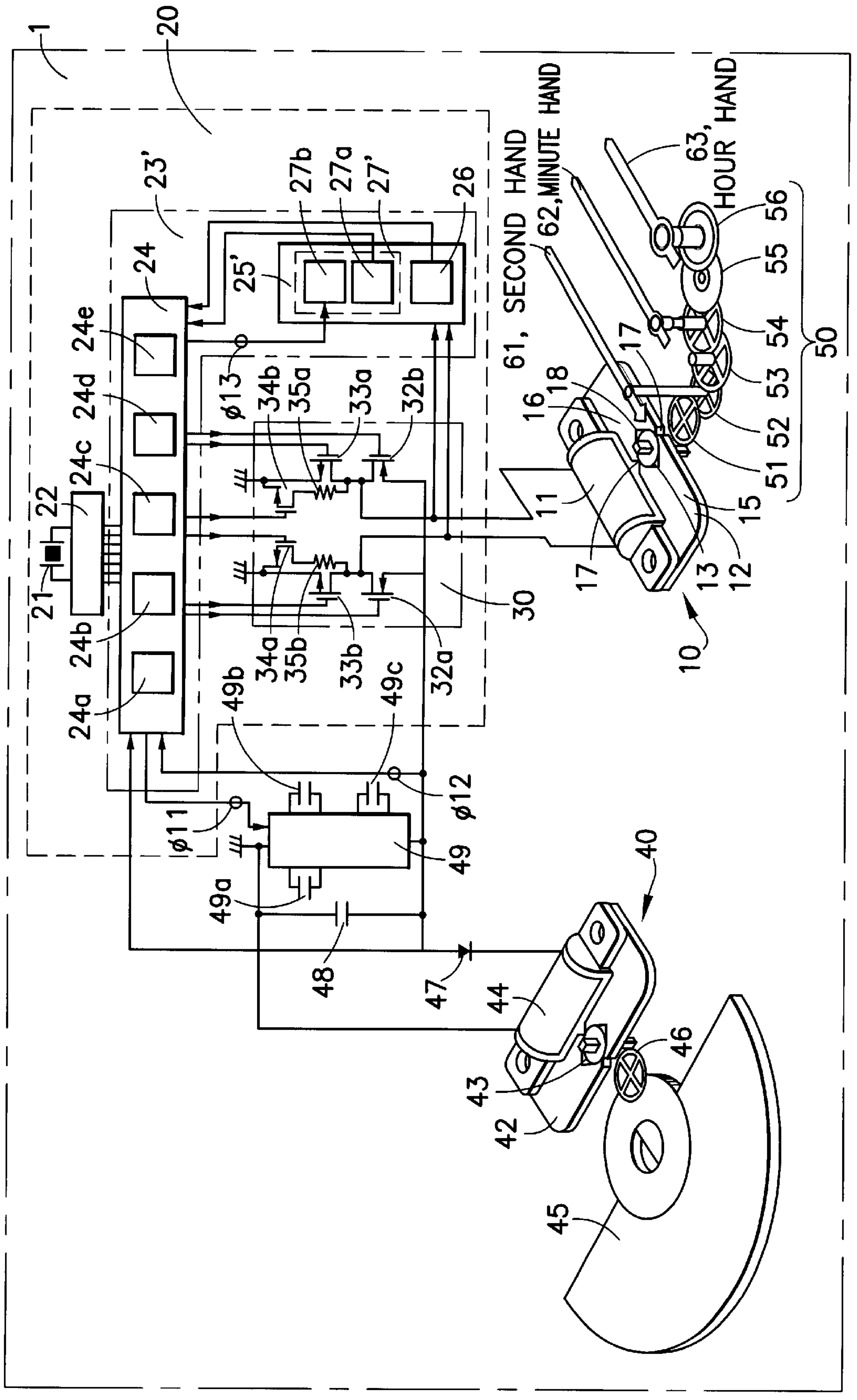
FIG. 1 is a schematic representation of a timing device including a stepping motor and electricity generating device constructed in accordance with the present invention.
Figure 12:
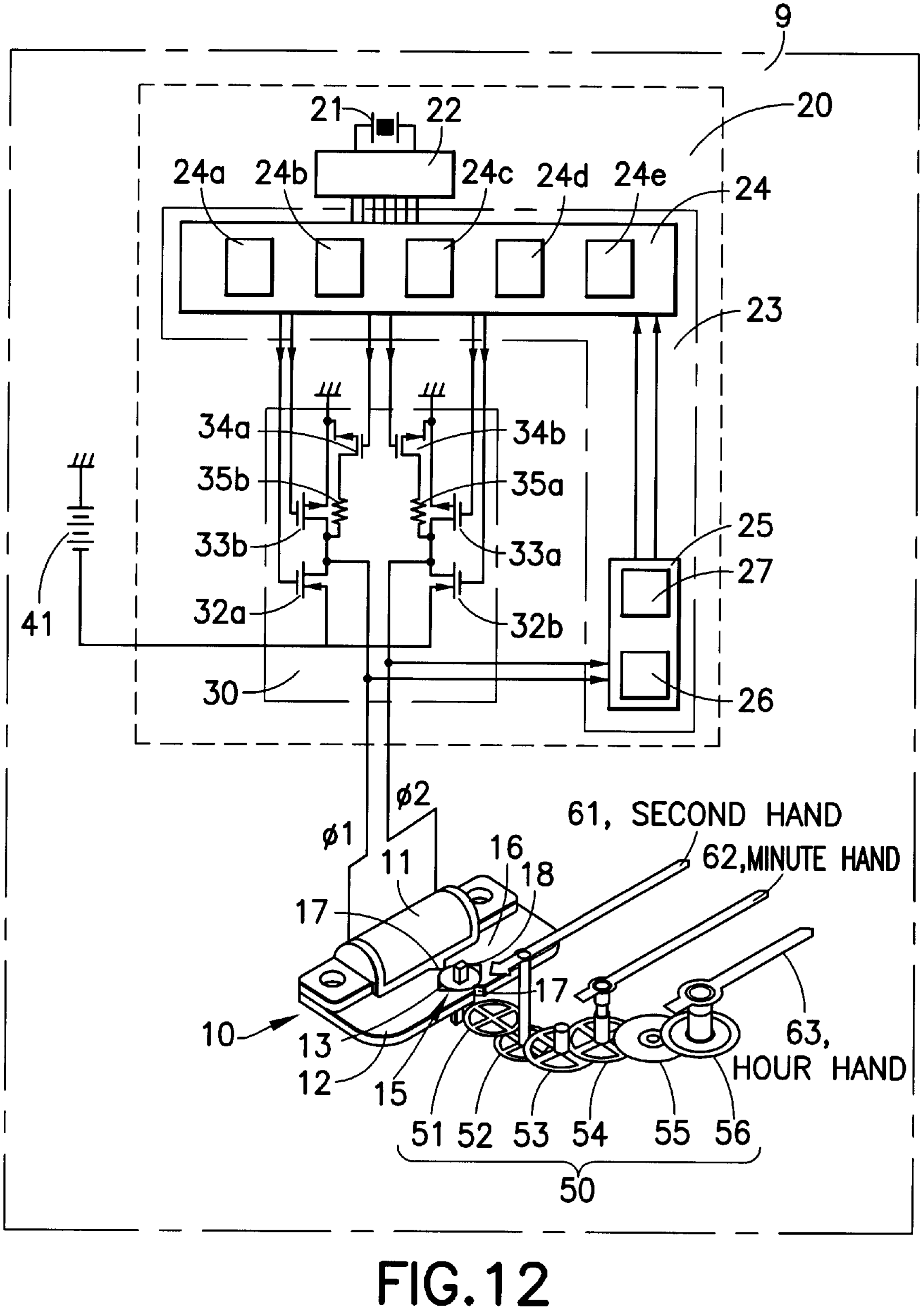
FIG. 12 PRIOR ART
FIG. 12 is a schematic representation of a prior art timing device.
Figure 13:
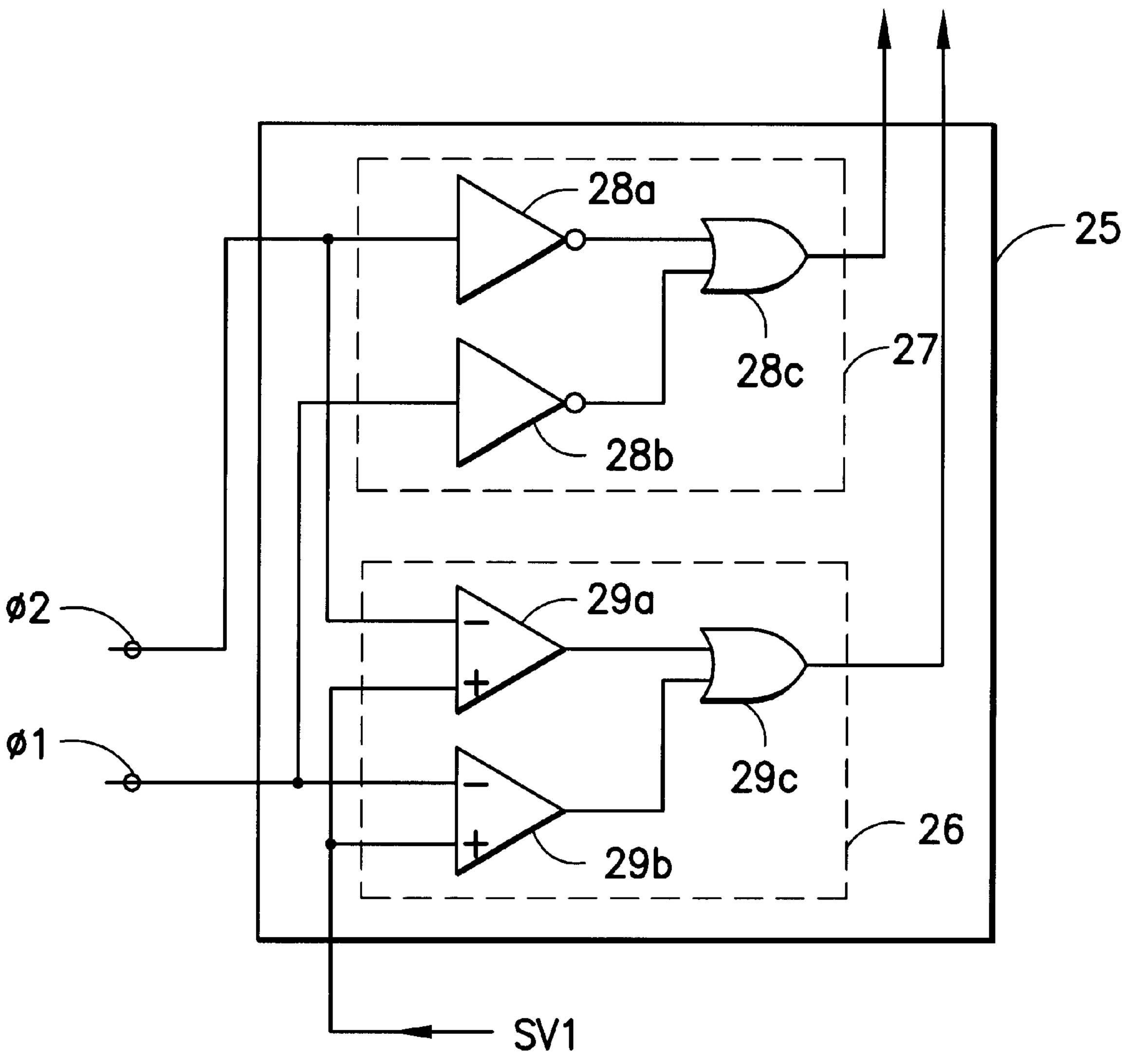
FIG.13 PRIOR ART
FIG. 13 is a schematic representation of the detecting circuit employed in the timing device shown in FIG. 12.

Referring now to FIG. 1, there is shown a schematic diagram of a timing device 1 of the first embodiment. In timing device 1, stepping motor 10 is driven by control device 20, and the movement of stepping motor 10 is transferred via gear train 50 to second hand 61, minute hand 62, and hour hand 63. Because the basic construction of stepping motor 10, gear train 50, and control device 20 is the same as described above with respect to FIG. 12, common elements will be denoted with like reference numerals and the detailed description thereof will be omitted.

Timing device 1 is provided with an electricity generating device 40 which acts as an electric power source. Electricity generating device 40 is an alternating current electricity generating device of the electromagnetic induction type and includes a generating rotor 43 that rotates within a generating stator 42 and is capable of outputting electricity induced in a generating coil 44. Further, timing device 1 uses a rotating weight 45 for transferring kinetic energy to generating rotor 43 via a speed-increasing gear 46. In timing device 1, which may be in the form of a wristwatch, for example, rotating weight 45 captures the natural movements of the arm of the user which causes rotating weight 45 to rotate within timing device 1, thereby generating electricity capable of driving timing device 1.

The power output from electricity generating device 40 is half-wave rectified by a diode 47, and is then temporarily stored in a large capacity condenser 48. The driving voltage for driving stepping motor 10 is supplied by condenser 48 is coupled between ground, coil 44 and driving circuit 30 supplies condenser 48 power to driving circuit 30 of control device 20 via a booster/reducer circuit 49. Booster/reducer circuit 49 is connected in parallel with condenser 48 and includes a plurality of condensers 49*a*, 49*b*, and 49*c*, so that multi-step boosting and reduction can be performed. In this way, the voltage supplied to driving circuit 30 from driving control circuit 24 of control device 20 may be adjusted by way of a control signals ϕ11 transmitted between driving control circuit 24 and booster/reducer circuit 49. The output voltage of booster/reducer circuit 49 is also supplied to driving control circuit 24 via a monitoring circuit ϕ12 so that, by monitoring the minute increases or decreases in output voltage, driving control circuit 24 may determine whether electricity generating device 40 is generating electricity.

Control circuit 23', included in control device 20, includes driving control circuit 24 and detecting circuit 25'. Driving control circuit 24 includes: driving pulse supplying unit 24*a*, which supplies driving pulses P1 to driving coil 11 via driving circuit 30; rotation detecting pulse supplying unit 24*b*, which supplies rotation detecting pulse SP2 following driving pulses P1; magnetic field detecting pulse supplying unit 24*c*, which supplies magnetic field detecting pulse SP0 and SP1 for detecting a magnetic field before driving pulse P1 is output; auxiliary pulse supplying unit 24*d*, which supplies auxiliary pulses P2 having a greater effective electric power than that of driving pulses P1; and demagnetizing pulse supplying unit 24*e* for supplying demagnetizing pulses PE following auxiliary pulses P2.

By controlling booster/reducer circuit 49, the effective electric power of driving pulse P1 supplied by driving pulse supplying unit 24*a* can be adjusted. The effective electric power of driving pulse P1 can be varied by adjusting the pulse width and/or the voltage so that fine control of the driving voltage becomes possible. Thus driving pulse P1 having an optimal voltage for rotating driving rotor 13 can be supplied thereby conserving electricity.

Furthermore, driving pulse supplying unit 24*a* acts as a short-pulse supplying unit for supplying short pulses including fast-forward pulses, reverse pulses and short-cycle driving pulses. However, because the voltage supplied to driving circuit 30 during electricity generating is difficult to stabilize and may cause the voltage level of driving pulses to fluctuate, driving timing device 1 during electricity generation may lead to errors in the movement of the hands. This is especially the case with fast-forward pulses which, have a short pulse width that is necessary so that they can be output in short intervals before driving rotor 13 comes to a halt. Because these short pulses are likely to be adversely affected by the presence of an external magnetic field, the generation of fast-forward pulses are forcibly terminated when there is a high possibility that there is electricity being generated, for example, when an external magnetic field is detected, and the movement of the hands resumes at normal speed. Thus, a signal ϕ12 is used to monitor the output of electricity generating device 40 and terminate the fast-forward pulses if it is determined that electricity is being generated. This also applies to the driving pulses generated by driving pulses supplying unit 24*a* used to drive rotor 13 in a reverse direction (reverse pulses). Reverse driving pulses are also short pulses because two or three of the reverse pulses need be output in order to drive one step angle. Therefore, because the reverse driving pulses may also be adversely affected by the presence of an external magnetic field, it is preferable that these pulses are terminated during electricity generation as well.

Magnetic field detecting pulse supplying unit 24*c* is configured to output pulses SP1 for detecting low-frequency alternating current magnetic fields from the reverse pole side, as is done in the conventional devices, as well as for detecting the same frequency band magnetic fields from the driving side thereby greatly increasing the probability of detecting magnetic fields. Because electricity generating device 40 generates electricity based on the movement of rotating weight 45 that rotates generating rotor 43, electricity generation is intermittent and often occurs for short intervals of time, for example 100 ms. Therefore, if magnetic field detecting pulse SP1 is output on the reverse side alone, as in the conventional devices it is possible that electricity is being generated during the outputting of rotation detecting pulse SP2, and rotation detection errors would occur due to the magnetic field generated by electricity generating device 40. Furthermore, because the electric power from electricity generating device 40 is half-wave rectified by diode 47, there is the possibility that, depending on the direction of rectification, the alternating current magnetic field may not be present on the reverse pole side. Therefore, by outputting alternating current magnetic field detecting pulses SP1 from both the driving pole and the reverse pole side, the detection interval is extended and the presence of the magnetic field on the driving side may also be detected. Accordingly, the probability of detecting the magnetic field is greatly increased, and the error in movement of the hands due to erroneous rotation detection is prevented.

In prior art systems, detection of an alternating current magnetic field is generally not done on the driving side because the presence of a residual magnetic field resulting from auxiliary pulse P2 makes detection almost impossible. However, in the present invention, detection of magnetic fields which affect rotation detection is improved by detecting the presence of a magnetic field on both the driving and reverse pole sides, which also extends the time spent on detecting magnetic fields. Accordingly, there is an increased likelihood of detecting magnetic field generated by the electricity generating device 40 which, because of their frequency, that is greater than the conventional 50 to 60 Hz alternating current magnetic field and bursty properties, are otherwise difficult to detect. Thus, erroneous detection of rotation of rotor 13 is prevented.

Figure 2:
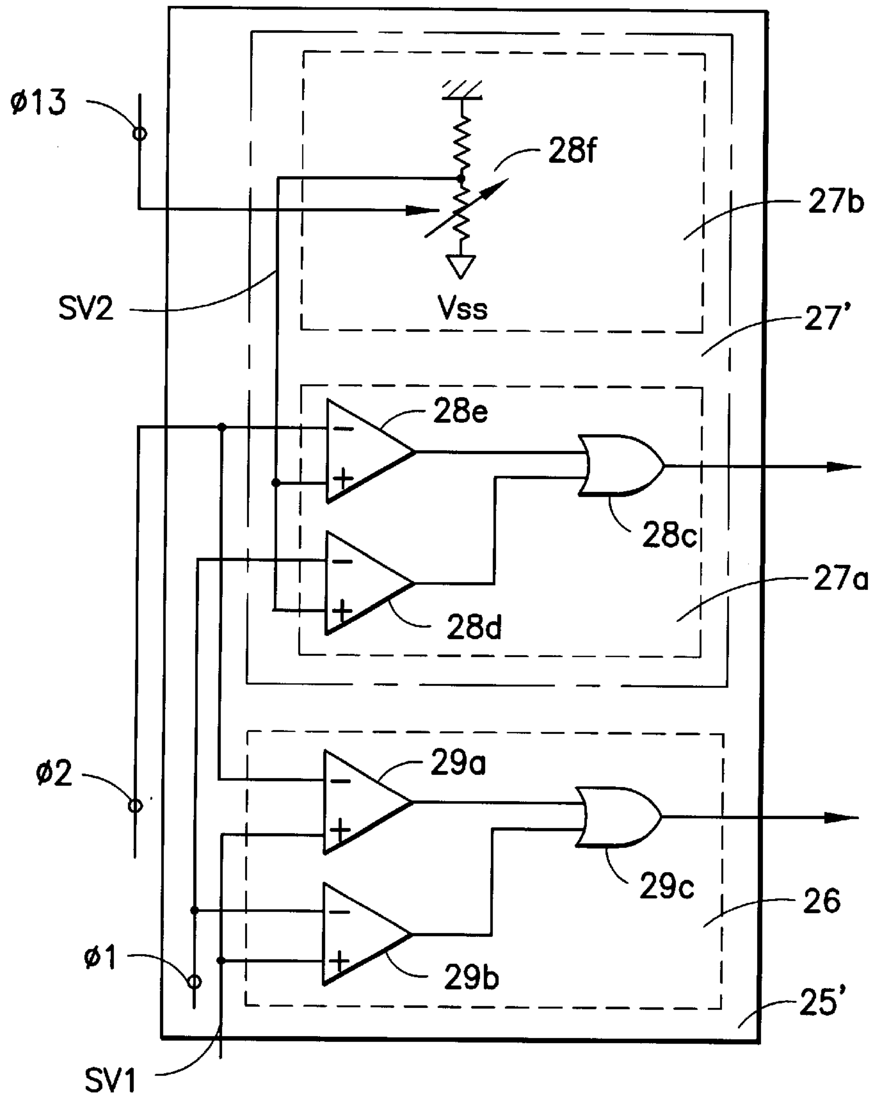
FIG. 2 is a schematic representation of the detecting circuit used in the timing device shown in FIG. 1.
Figure 3:
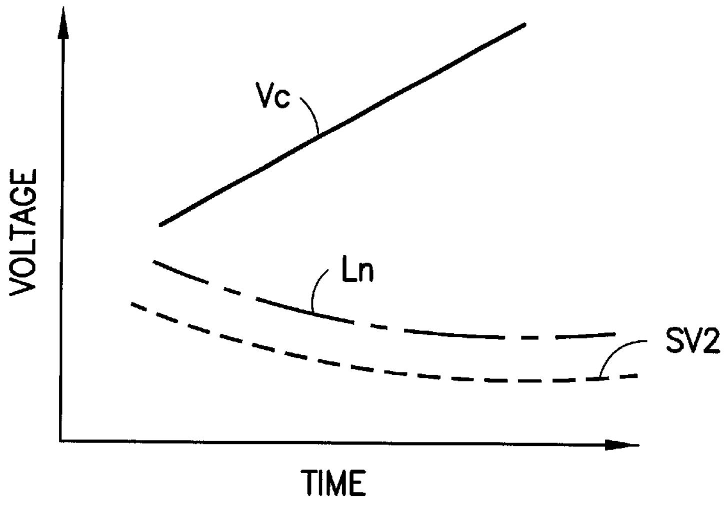
FIG. 3 is a graph of the condenser charging voltage over time.

Referring now to FIGS. 2–3, there is shown a detecting circuit 25' including a rotation detecting unit 26, and a magnetic field detecting unit 27' which includes a detecting unit 27*a* and a setting unit 27*b*. Setting unit 27*b* controls the production of set value SV2 used by magnetic field detecting unit 27' for detecting the voltage inducted by driving coil 11 in response to magnetic field detecting pulses SP0 and SP1. Set value SV2 is controlled by a controlling circuit 28*f* which, for example, may use a variable resistor, which varies in response to ϕ13 from drive control circuit 24 to adjust set value SV2. By lowering the value of set value SV2, the sensitivity detection of magnetic fields is further increased.

Detection unit 27*a* of magnetic field detection unit 27' uses a pair of comparators, 28*d* and 28*e*, for comparing the voltage generated in driving coil 11 in each direction, respectively, with set value SV2. Comparator 28*d* receives one input from set value SV2 and a second input ϕ1 from one side of driving coil 11 and produces a first comparison signal. Similarly, comparator 28*e* receives one input from set value SV2 and a second input ϕ2 from the other side of driving coil 11 and produces a second comparison signal. An OR gate 28*c* receives the first and second comparison signals and produces an output to driving control circuit 24.

As shown in FIG. 3, when electricity generating device 40 generates electricity and electric power is stored in condenser 48, the charging voltage, Vc, increases with the passage of time. Thus, the S/N ratio between the control signal ϕ13 and noise, Ln, due to magnetic fields increases, i.e., noise level Ln decreases relative to control signal ϕ13. As a result, the ability to detect magnetic fields generated by electricity generating device 40 decreases as charging voltage Vc increases even though the intensity of the magnetic field itself does not decrease. To prevent this from occurring, ϕ13, which is proportional to charging voltage Vc, is supplied from driving control circuit 24 to setting unit 27*b*. So that set value SV2 may be adjusted to increase detection sensitivity.

Like the conventional device previously described, in timing device 1, auxiliary pulse supplying unit 24*d* of driving control circuit 24 supplies auxiliary pulse P2 having greater effective electric power than driving pulse P1. If it is determined by rotation detecting unit 26 of detection circuit 25 that driving rotor 13 did not rotate or if a magnetic field is detected by magnetic field detecting unit 27, auxiliary pulse P2 is output ensuring that driving rotor 13 rotates. However, because the detection capabilities of magnetic field detecting unit 27 is increased in the present invention, auxiliary pulses P2 may be output without having to actually determine whether rotor 13 is rotated. Therefore, the effects of the magnetic field generated by electricity generating device 40 or externally are minimized, thereby enabling movement of the hands with very high reliability.

Auxiliary pulse supplying unit 24*d*, according to the present embodiment, may be configured to supply different auxiliary pulses suitable in a variety of situations. These include supplying auxiliary pulses for when driving rotor 13 does not rotate in response driving pulse P1, when a high-frequency magnetic field has been detected using magnetic field detecting pulse SP0, and when low-frequency magnetic field has been detected using magnetic field detecting pulse SP1. Although it is possible to keep the effective power of these different auxiliary pulses the same, it is possible to supply auxiliary pulses having different effective electric powers for each of these situations.

Also, according to the present embodiment, demagnetizing pulse supplying unit 24*e*, which outputs demagnetizing pulses PE, is constructed so that the output of demagnetizing pulse PE is delayed from being output immediately after auxiliary pulse P2, as in conventional systems, and instead output immediately before the next driving pulse P1 is output. As a result, the effective electric power of the next driving pulse P1 is increased so that sufficient energy for rotating rotor 13 is provided without the need to increase the actual energy level of driving pulse P1. In this way, errors in the movement of hands can be prevented while also reducing the need to use auxiliary pulses having greater power to rotate rotor 13 when magnetic fields from the electricity generating device or external magnetic fields are present. Also, by supplying driving pulse P1 having a substantially high effective electric power, the rotation of rotor 13 is thereby eliminating the need to perform rotation detection and magnetic field detection which is usually ineffective following the output of auxiliary pulse P2.

Figure 4:
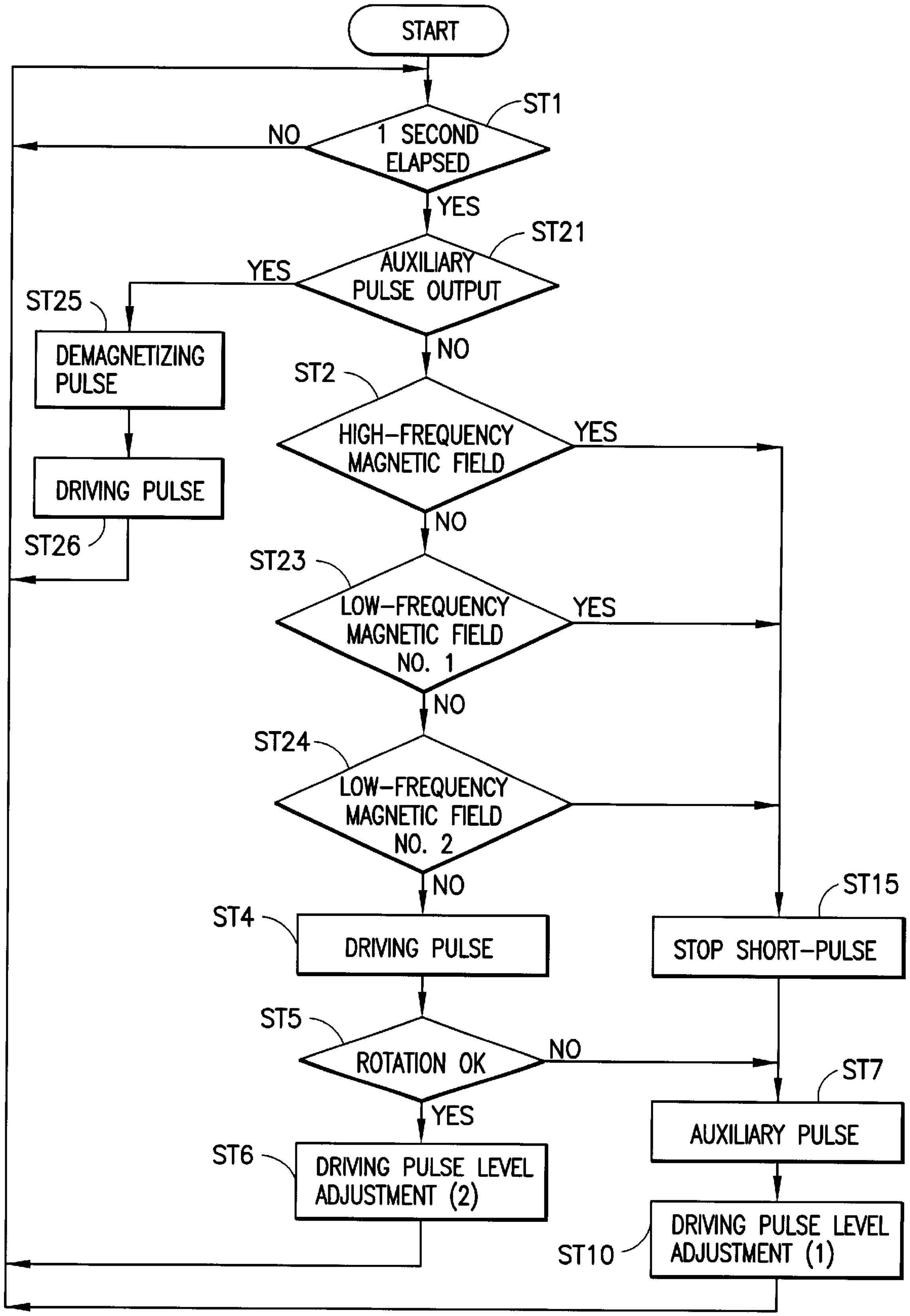
FIG. 4 is a flowchart illustrating the control method of the control device according to a first embodiment of the present invention.
Figure 15:
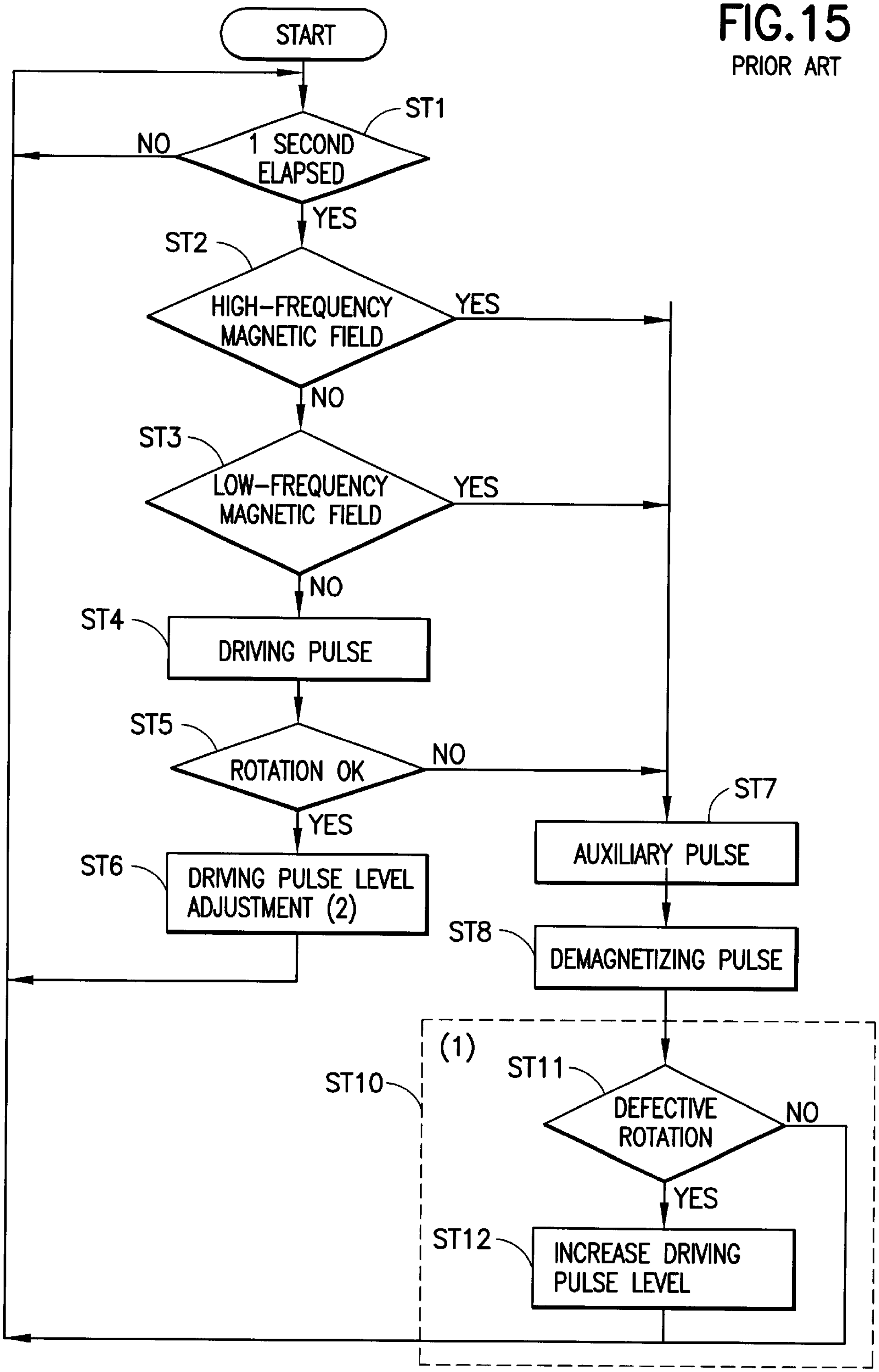
FIG. 15 PRIOR ART
FIG. 15 is a flowchart illustrating the control method of the control device in accordance with the prior art.

Referring now to FIG. 4, there is shown a flowchart of the method of controlling stepping motor 10 employed in timing device 1 according to the present embodiment. Flowchart steps that correspond to steps previously described in connection with the control method described in FIG. 15 are denoted by the same reference numerals, and detailed a description thereof will be omitted.

First, in step ST1, a one second duration of time is measured for movement of the hands. After one second has elapsed, in step ST21 a determination is made whether auxiliary pulse P2 was output in the previous cycle. If auxiliary pulse P2 was output in the previous cycle, in step ST25, demagnetizing pulse PE having a reverse polarity than that of auxiliary pulse P2 is output immediately before driving pulse P1 is output in step ST26. Accordingly, in the cycle following output of auxiliary pulse P2, the electric power of demagnetizing pulse PE is used to substantially increase the effective electric power of driving pulse P1.

If auxiliary pulse P2 has not been output in the previous cycle, in step ST2, it is determined whether high-frequency magnetic fields are present using magnetic field detecting pulse SP0, as in the conventional systems. However, in the present embodiment, magnetic field detecting unit 27 adjusts set value SV2 according to charging voltage VC, so that a high level of detection sensitivity of magnetic fields is maintained even as charging voltage VC rises. If a high-frequency magnetic field was detected in step ST4, it is possible that it is because electricity generating device 40 is generating electricity. Therefore, if short pulses, such as fast-forward pulses or reverse pulses, are being output, the output of those short pulses are forcibly terminated in step ST15. Further, in step ST7, auxiliary pulse P2, having a greater effective electric power than driving pulse P1, is output instead of driving pulse P1 thus ensuring that rotor 13 rotates and preventing errors in the movement of the hands due to unreliable rotation detection.

If no high-frequency magnetic field is detected in step ST2, in steps ST23 and ST24, magnetic field detecting pulses SP1 are output to the driving pole side and the reverse pole side, respectively, to determine whether a low-frequency alternating current magnetic field exists. Because set value SV2, used in steps ST23 and ST24 to evaluate the induction voltage caused by the magnetic field, varies with charging voltage Vc, high detection capabilities are maintained even as charging voltage Vc changes as the output of electricity generating device 40 changes. If an alternating current magnetic field is detected, it is possible that it is because of electricity generating device 40 generating electricity which may cause the voltage levels of short pulse to become unstable. Therefore, if a low frequency field is detected in step ST23 or step ST24, in step ST15, the output of short pulses is forcibly terminated as described above. Also, auxiliary pulse P2 is output in step ST7 instead of driving pulse P1, thus preventing an error in the movement of the hands.

If there is no detection of magnetic field in steps ST2, ST23 or ST24, driving pulse P1 is output in step ST4, and then, in step ST5, rotation detecting pulse SP2 is output to determine whether rotor 13 rotated. If the rotation cannot be confirmed, auxiliary pulse P2, having a greater effective electric power than driving pulse P1, is output in step ST7, thereby ensuring that rotor 13 rotates. In conventional control methods, once auxiliary pulse P2 is output, demagnetizing pulse PE is also output immediately thereafter. However, in the present invention, demagnetizing pulse PE is not output at this time but instead is output in step ST25 immediately before driving pulse P1 of the next cycle is output, as described above.

If auxiliary pulse P1 was output in step ST7, level adjustment of driving pulse P1 (first level adjustment) is performed in step ST10. In this way, a driving pulse P1, having a greater effective electric power than driving pulse P1, is supplied for the next cycle. On the other hand, if rotation of rotor 13 was confirmed in step ST5, level adjustment for lowering the effective electric power of driving pulse P1 (second level adjustment) is performed in step ST6. In many cases, the effective electric power of driving pulse P1 is lowered at certain cycles. By performing level adjustment of driving pulse P1, the power consumption of driving pulse P1 is reduced and errors in the movement of the hands due to magnetic fields from electric household appliances are eliminated so that timing device 1 with high reliability and low power consumption is provided.

Figure 5:
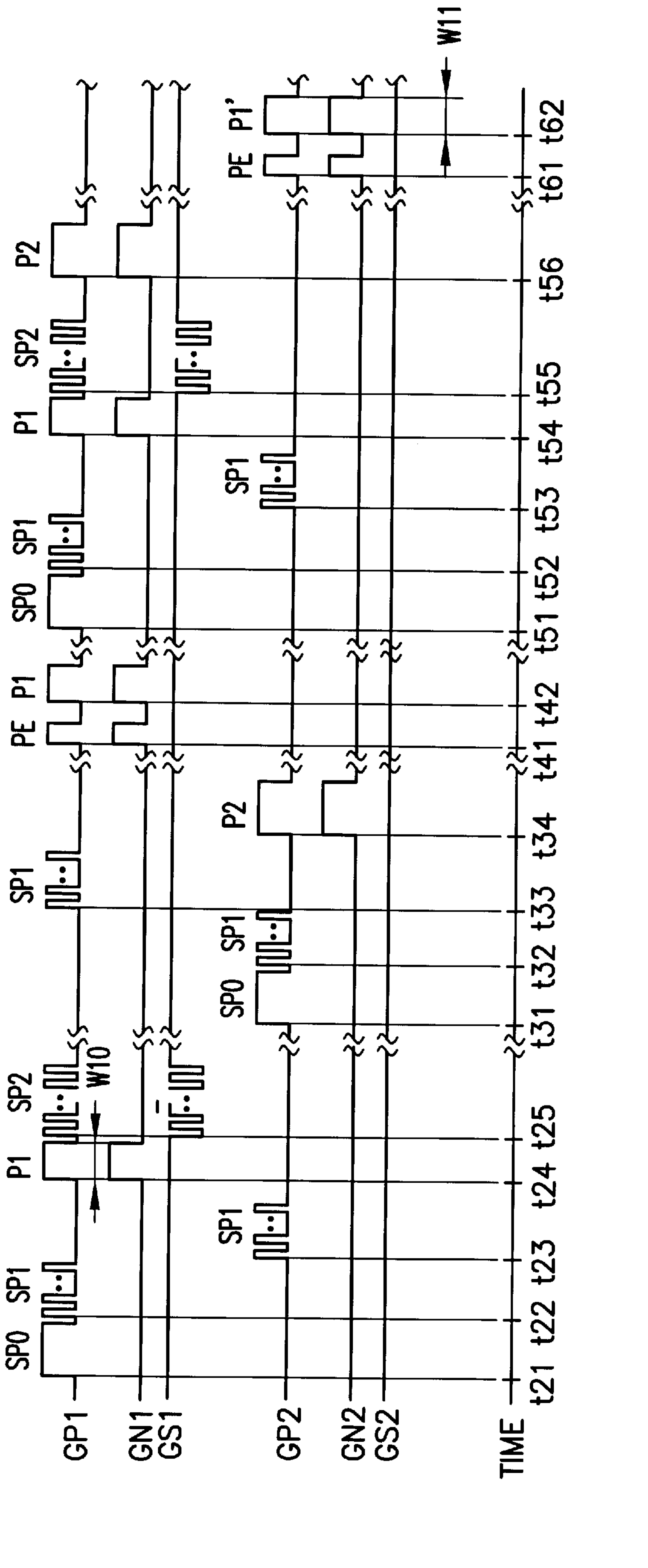
FIG. 5 is a timing chart illustrating the operation of the control device in accordance with the method of FIG. 4.
Figure 14:
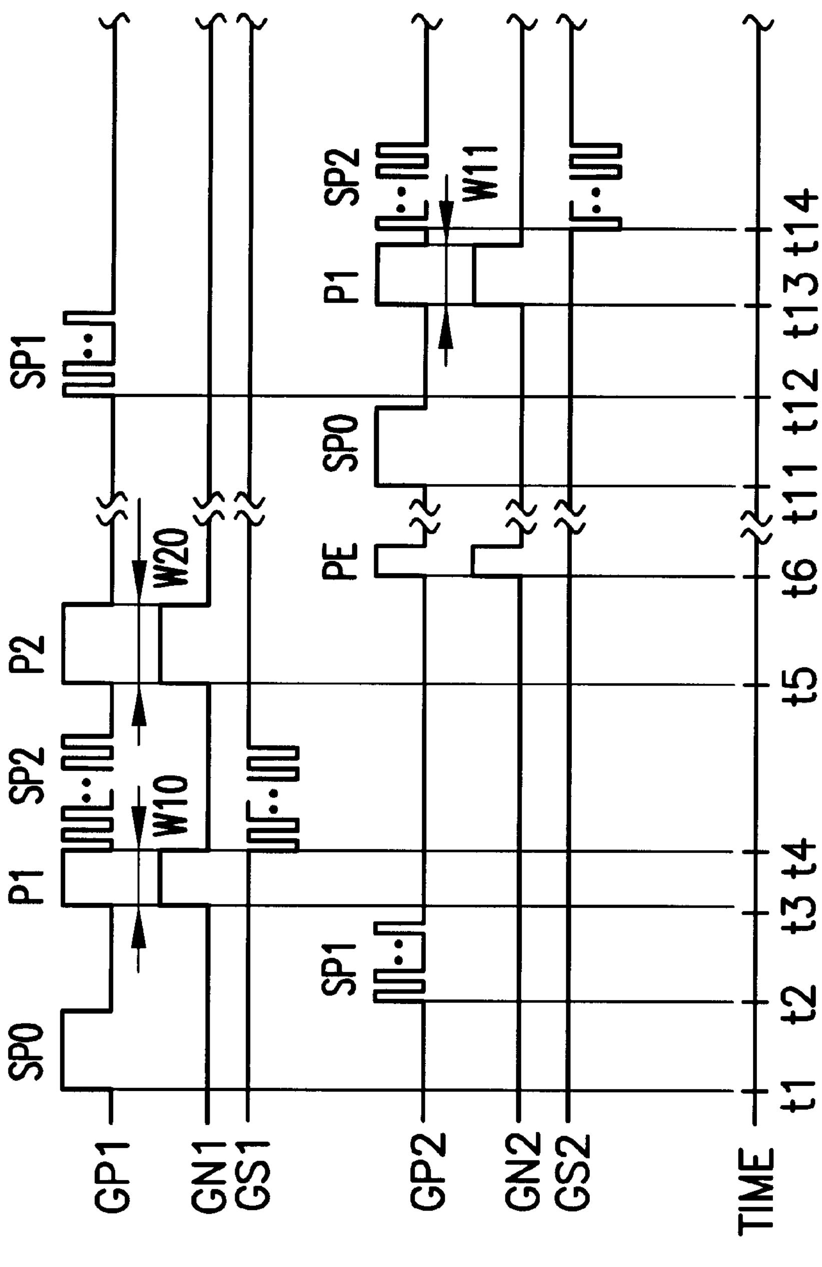
FIG. 14 PRIOR ART
FIG. 14 is a timing chart illustrating the operation of the control device in accordance with the prior art.

Referring now to FIG. 5, there is shown a timing chart illustrating the operation of control device 20 according to the present embodiment. As with the conventional device depicted in FIG. 14, FIG. 5 illustrates the control signals that are supplied to gates GP1, GN1, and GS1 of the p-channel MOSFET 33*a*, n-channel MOSFET 32*a*, and sampling p-channel MOSFET 34*a*, respectively, for excitation of driving coil 11 of a magnetic field of one polarity, and to gates GP2, GN2, and GS2 of the p-channel MOSFET 33*b*, n-channel MOSFET 32*b*, and sampling p-channel MOSFET 34*b*, respectively, for excitation of a magnetic field of the reverse polarity. Like elements to those described in FIG. 14 are denoted by the same reference numerals and a description thereof is omitted.

Initially, when one second of time elapses in step ST1, and no output of auxiliary pulse P2 has occurred in the previous cycle, operation moves from step ST21 to ST2. In step ST2, the first cycle begins when magnetic field detecting pulse SP0 is output at time t21 for detecting a high-frequency magnetic field. Next, in steps ST23 and ST24, control signals are supplied so that magnetic field detecting pulses SP1 are output at time t22 and t23, respectively, for detecting alternating current magnetic fields at both pole gates GP1 and GP2. If no magnetic field is detected in steps ST23 and ST24, driving pulse P1 having a pulse width of, for example W10, is supplied at time t24 in step ST4. Next, rotation detecting pulse SP2 is output at time t25 in step ST5. If the rotation of driving rotor 13 is detected, this cycle is completed, and the system returns to step ST1 and conducts timing.

When the next cycle is started at time t31, a control signal for outputting magnetic field detecting pulse SP0 for detecting a high-frequency noise magnetic field is supplied to the driving pole side gate GP2 which is on the opposite side as compared to the previous cycle. Subsequently, control signals are supplied to output magnetic field detecting pulses SP1 to each pole gate GP2 and GP1 at time t32 and t33, respectively. If electricity generating device 40 has started generating electricity, the induction voltage generated by the magnetic field reaches set value SV2, and a magnetic field is detected in steps ST23 or ST24. Once the magnetic field has been detected, the rotation of rotor 13 is ensured by outputting auxiliary pulse P2 in step ST7, having a greater effective electric power than driving pulse P1, instead of driving pulse P1, at time t34.

When the next cycle is started at time t41, a determination is made in step ST21 as to whether auxiliary pulse P2 was output in the previous cycle. If auxiliary pulse P2 was output, demagnetizing pulse PE is immediately output in step ST25, with driving pulse P1 being output immediately thereafter at time t42 in step ST26. Because demagnetizing pulse PE has a reverse polarity than that of auxiliary pulse P2, and driving pulse P1 of the next cycle is output immediately after the output of demagnetizing pulse PE, the effective electric power output of driving pulse P1 is substantially increased. By increasing the effective electric power output of driving pulse P1, rotation of rotor 13 is ensured even in the presence of a magnetic field attributable to electric power generation or a residual magnetic field and, because rotation detection can be omitted, the danger of an erroneous rotation detection is eliminated. Also, because magnetic field detection capabilities deteriorate as a result of auxiliary pulse P2 being output, the fact that magnetic field detection can be omitted is immensely advantageous. Thus, by timing demagnetizing pulse PE in such a manner, movement of the hands can be conducted reliably. Further, the energy of demagnetizing pulse PE can also be used to rotate rotor 13, so that overall electricity consumption can also be reduced.

After driving pulse P1 is output in the step ST26, the system returns to step ST1 and conducts timing. Then, when the next cycles begins, magnetic field detecting pulse SP0, used for detecting high-frequency magnetic field noise, is output at time t51 in the same manner as described above. Also, pulses SP1 for detecting alternating current magnetic fields, are sequentially output to both pole sides at time t52 and t53, respectively. When electricity generating device 40 has stopped generating electricity and a magnetic field is not detected, driving pulse P1 is output at time t54, and thereafter, rotation detecting pulse SP2 is output. If rotation of rotor 13 is not detected in step ST5, auxiliary pulse P2 is output in step ST7. At this point demagnetizing pulse PE is not output and the cycle is completed. Once the next cycle begins at time t61, demagnetizing pulse PE is then output at time t61.

At time t62, a driving pulse P1' having a substantially increased effective power as compared to driving pulse P1, is output so that the rotation of rotor 13 is ensured. The effective electric power of driving pulse P1' was increased in step ST10 because, for example, rotation could not be detected in the previous cycle. In the present embodiment, driving pulse P1' has a pulse width W11 that is wider than the width of driving pulse P1 output in the previous cycle. However, by using booster/reducer circuit 49, the effective electricity of driving pulse P1' may be controlled by increasing the voltage level instead of or in addition to increasing the pulse width.

Figure 6:
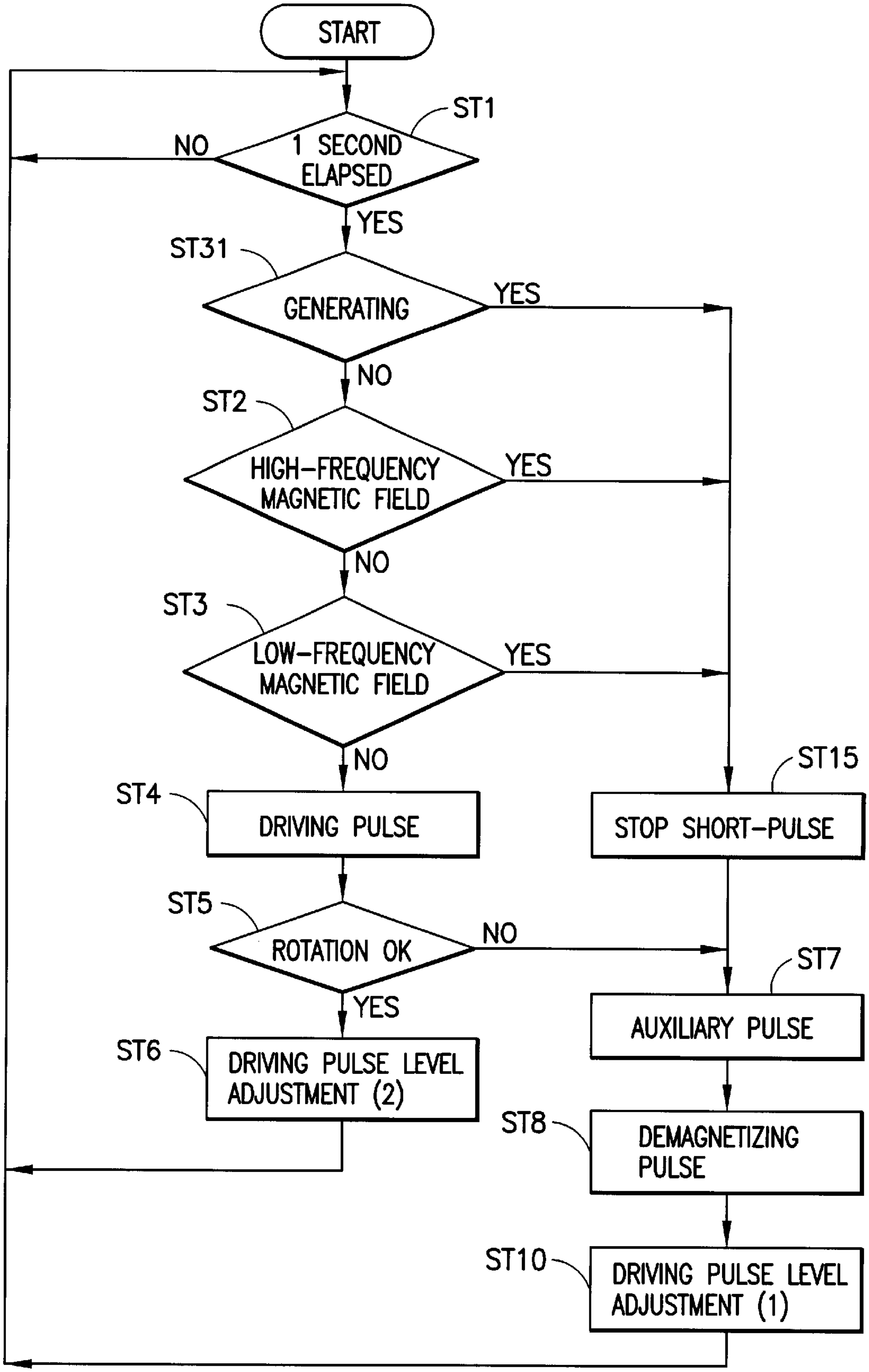
FIG. 6 is a flowchart illustrating the control method of the control device according to a second embodiment of the present invention.
Figure 7:
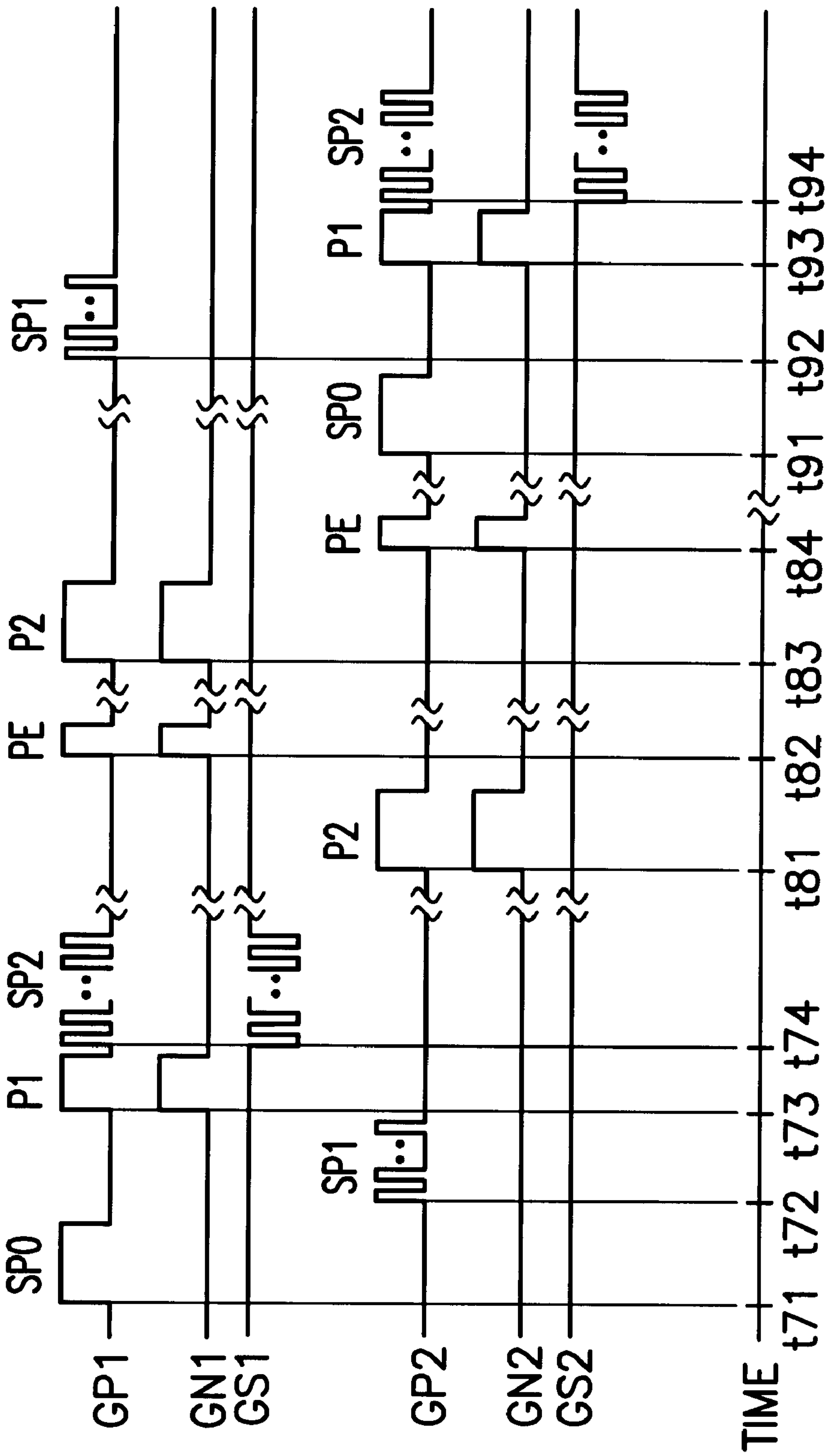
FIG. 7 is a timing chart illustrating the operation of the control device in accordance with the method of the second embodiment of the invention.

Referring now to FIGS. 6, 7, operation of timing device 1 in accordance with a second embodiment will be described. Because timing device 1 of the second embodiment uses the same structure as the previous embodiment, a detailed description of the drawings will be omitted.

In control device 20 of timing device 1, according to the second embodiment, output voltage $\phi 12$ of booster/reducer circuit 49 is monitored to determine whether electricity generating device 40 is generating electricity. If it is found that electricity generating device 40 is generating electricity, fast-forward pulses output by driving pulse supplying section 24*a* is forcibly terminated. Also, because reliable rotation detection is difficult to accomplish in the presence of electricity generation, magnetic field detecting pulses SP0 and SP1 are not output, and auxiliary pulse P2, which has a greater effective electric power, than driving pulse P1, is output. The effective energy of auxiliary pulse P2 is selected so that rotation of rotor 13 is ensured thereby eliminating the need to perform rotation detection. Accordingly, errors in the movement of the hands resulting from noise generated by rotation detection and from unreliable rotation detection can be prevented. Also, because auxiliary pulse P2 decreases magnetic field detection capabilities, detecting whether electricity is being generated instead further improves reliability.

The flowchart of FIG. 6 depicts the control method of stepping motor 10 employed in the second embodiment. Flowchart steps that correspond to steps in the previous embodiment are denoted by the same reference numerals, and a detailed description thereof will be omitted.

First, in step ST1, one second of time is measured for movement of the hands. Next, in step ST31, it is determined whether electricity generating device 40 is generating electricity. If electricity generating device 40 is generating electricity, voltages will fluctuate causing errors in the movement of the hands. Accordingly, any fast-forward control or reverse control pulses being output from driving pulse supplying section 24*a* are forcibly terminated. Furthermore, considering that rotation detection is unreliable when electricity is being generated by electricity generating device 40, magnetic field detecting pulses SP0 and SP1 are not output, and auxiliary pulse P2 is output instead of pulse P1 in step ST7 thereby ensuring that rotor 13 is rotated. Therefore, because in the this embodiment, magnetic field detecting pulses SP0 and SP1 and rotation detecting pulse SP2 are omitted when electricity is being generated and auxiliary pulse P2 is supplied overall, power consumption related to driving rotor 13 is optimally reduced.

If electricity is not being generated by electricity generating device 40, magnetic field detecting pulse SP0 is used for determining whether an external high-frequency magnetic field is present in step ST2, and magnetic field detecting pulse SP1 is used for determining whether an external alternating current magnetic field (low-frequency noise) is present in step ST3, as described above. Then, if there is no detection of magnetic fields which would interfere with rotation detection in either step ST2 or ST3, driving pulse P1 is output in step ST4, and subsequently, a rotation detecting pulse SP2 is output in step ST5, for detecting whether rotation of rotor 13 occurred. If rotation cannot be detected, auxiliary pulse P2 is output in step ST7, thereby ensuring that rotor 13 is rotated. Next, in step ST8, demagnetizing pulse PE is output, followed by the level adjustment of driving pulse P1 in ST10, if necessary. If, in step ST5, rotation of rotor 13 is detected, level adjustment is performed in step ST6 if rotation occurred, thereby lowering the effective electric power of driving pulse P1, if the conditions are favorable.

Referring now to FIG. 7, there is shown a timing chart illustrating the operation of control device 20 according to the second embodiment. As with the previous embodiment described in FIG. 5, FIG. 7 illustrates the control signals that are supplied to gates GP1, GN1, and GS1 of the p-channel MOSFET 33*a*, n-channel MOSFET 32*a*, and sampling p-channel MOSFET 34*a*, respectively, and to the gates GP2, GN2, and GS2 of the p-channel MOSFET 33*b*, n-channel MOSFET 32*b*, and sampling p-channel MOSFET 34*b*, respectively, of driving circuit 30. Like elements to those described in FIG. 5 are denoted by the same reference numerals and a detailed description thereof is omitted.

Initially, after a certain amount of time (one second) elapses in step ST1, and no electricity generation is detected in step ST31, the operation moves to ST2 where magnetic field detecting pulse SP0 is output at time t71 for detecting high-frequency magnetic fields. Next, in step ST3, magnetic field detecting pulse SP1, which detects alternating current magnetic fields, is output at time t72 to gate GP2 of the reverse pole side. Because in the second embodiment the operation of control device 20 depends on the detection of electricity generation and not on whether a magnetic field is present, there is no need to determine whether a magnetic field is present as a result of electricity generation. Accordingly, magnetic field detecting pulse SP1, which detects the alternating current magnetic field, is only output to the side opposite of the driving side (reverse side).

If a magnetic field is not detected in steps ST2 and ST3, driving pulse P1 is output at time t73 in step ST4, and subsequently, rotation detecting pulse SP2 is output at time t74 in step ST5. Then, if the rotation of driving rotor 13 is detected, this cycle is completed, and the system returns to step ST1 and conducts timing.

When the next cycle is started at time t81, it is first determined whether electricity generation is present and, in the event that it is, the system proceeds to step ST7 in which control signals for outputting auxiliary pulse P2 to gates GP2 and GN2 of the driving pole side, which is the reverse from the previous cycle, are supplied. Driving rotor 13 completely rotates by means of auxiliary pulse P2 rendering rotation detection unnecessary, and thereafter, demagnetizing pulse PE is output from the reverse pole side at time t82 in step ST8, thereby completing the cycle.

When the next cycle is started at time t83, if electricity generation is detected in step ST31, the system proceeds to step ST7, in which control signals for outputting auxiliary pulse P2 to gates GP1 and GN1 of the driving pole side, which is the reverse from the previous cycle, are supplied. Driving rotor 13 completely rotates by means of the auxiliary pulse P2 rendering rotation detection unnecessary, and thereafter, demagnetizing pulse PE is output from the reverse pole side at time t84 in step ST8, thereby completing the cycle.

When the next cycle is started at time t91, if electricity generation is detected in step ST31, the system performs magnetic field detecting in steps ST2 and ST3, and outputs both high-frequency detecting pulse SP0 and low-frequency detecting pulse SP1. If a magnetic field is not detected, driving pulse P1 is output at time t93 and the rotation of rotor 13 is confirmed at time t94. If a magnetic field is detected by either of the detecting pulses SP0 or SP1, auxiliary pulse P2 is output instead of the driving pulse P1, ensuring that rotor 13 rotates and rendering rotation detection unnecessary.

Thus, in timing device 1 constructed according to the second embodiment, a control method is employed in which it is assumed that a magnetic field, which would affect rotation detection, is present if electricity generating device 40 is generating electricity. Accordingly, the difficult and unreliable step of detecting the presence of a magnetic field generated by electricity generating device 40 is omitted thereby simplifying device control and eliminating error in movement of the hands. Also the consumption of electricity tends to decrease during electricity generation because movement of the hands is conducted using auxiliary pulse P2 which has great effective power. However, because the steps of detecting magnetic fields and detecting rotation of the rotor are also omitted, when auxiliary pulse P2 is used, the increase in overall electricity consumption as a result auxiliary pulse P2 is minimized. Furthermore, because it is possible that driving voltage will fluctuate during electricity generation, fast-forward and reverse are forcibly terminated. Thus, by monitoring whether electricity is being generated, timing device 1 according to the second embodiment achieves extremely high reliability and eliminates error in the movement of the hands.

Figure 8:
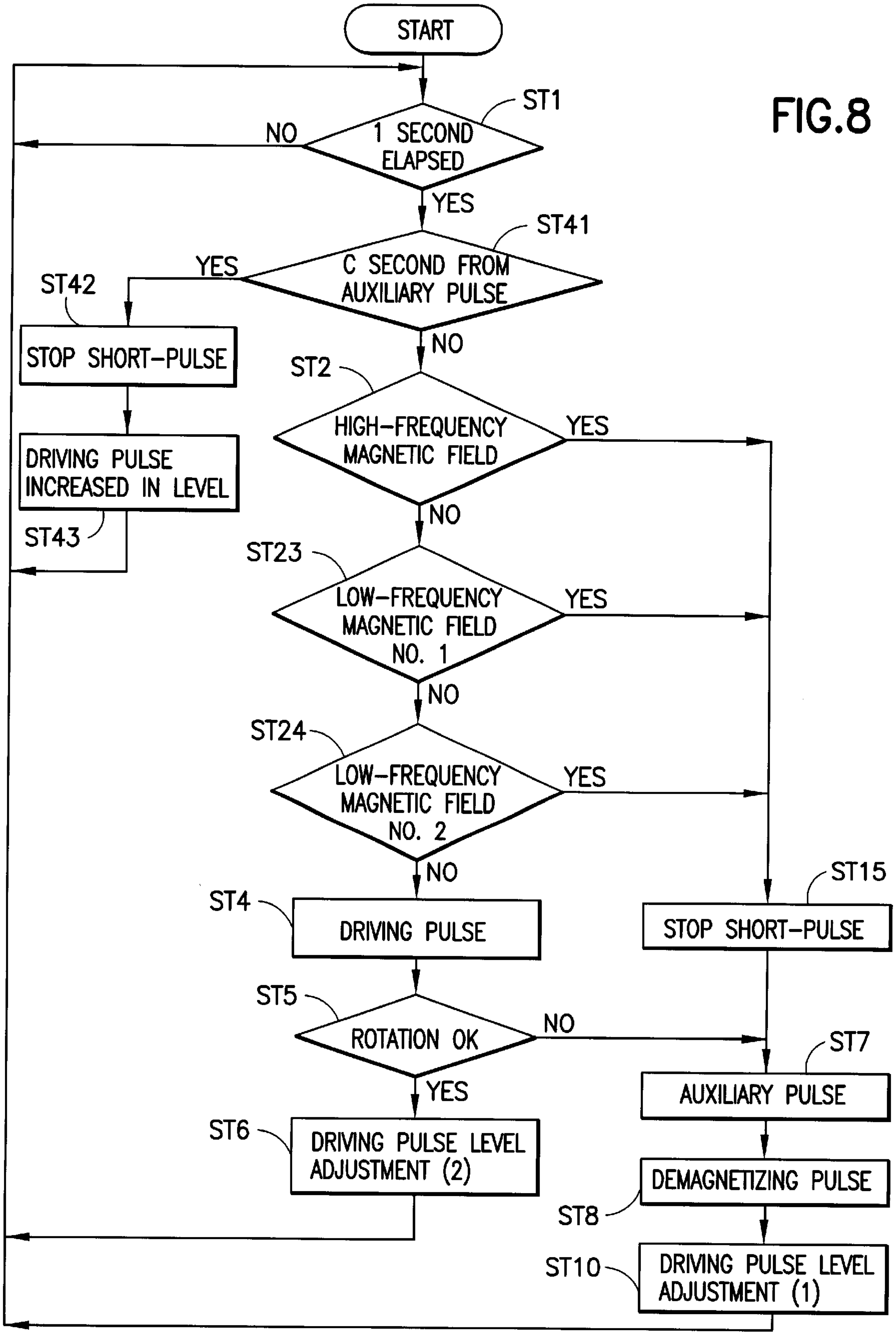
FIG. 8 is a flowchart illustrating the control method of the control device according to a third embodiment of the present invention.
Figure 9:
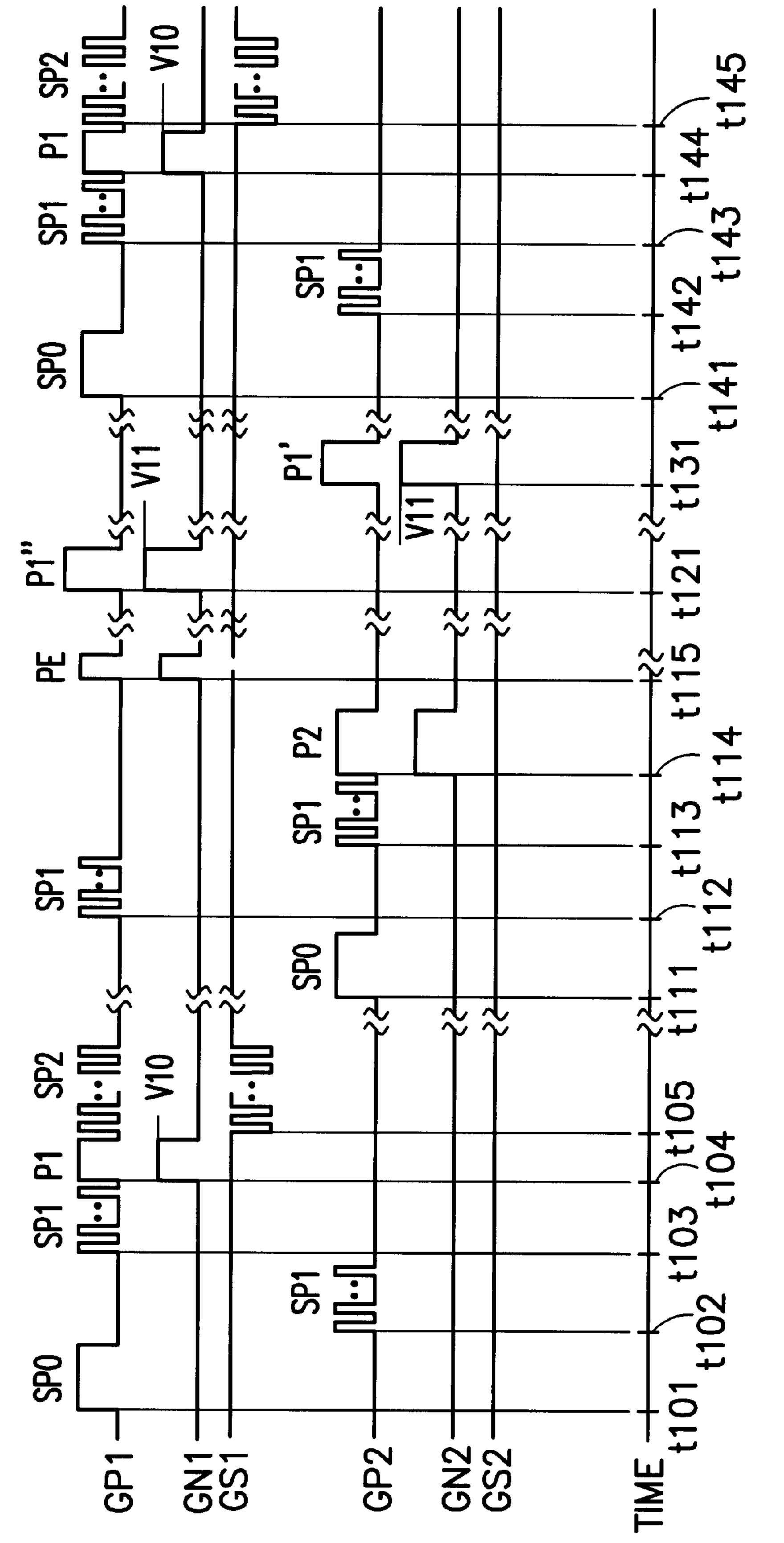
FIG. 9 is a timing chart illustrating the operation of the control device in accordance with the third embodiment of the invention.

Referring now to FIGS. 8, 9, timing device 1 operating in accordance with a third embodiment will be described. Because timing device 1 of the third embodiment uses the same structure as the embodiment described in FIG. 1, a detailed description of the drawings will be omitted.

Control device 20 of timing device 1 according to the third embodiment takes advantage of the fact that once a magnetic field is detected and auxiliary pulse P2 is supplied, electricity generating device 40 continues to operate for a certain period of time. Thus, it is assumed that a magnetic field is present for a certain number of cycles after auxiliary pulse P2 is output and, as a result, highly reliable processing is achieved. Driving pulse supplying unit 24*a* of the present embodiment is configured so that if auxiliary pulse P2 is output, a driving pulse P1" is supplied which has an effective electric power that is several levels greater than the driving pulse P1 previously supplied. Also, in this embodiment, it is assumed that electricity generation occurs whenever a magnetic field is detected, so fast-forward and reverse operations are forcibly terminated to prevent error in movement of the hands resulting from voltage fluctuation. Also, because auxiliary pulse P2 causes magnetic field detecting capabilities to deteriorate, detection of the magnetic field is not performed for the predetermined number of cycles in which driving pulses P1: having a greater effective electrical power are output.

The flowchart of FIG. 8 depicts the method of controlling stepping motor 10 employed in the third embodiment. Flowchart steps that correspond to steps in the previous embodiment are denoted by the same reference numerals, and a detailed description thereof will be omitted.

First, in step ST1, one second of time is measured for movement of the hands. Next, in step ST41, it is determined whether the preceding cycle is within a predetermined number of cycles C (certain time span) from the output of auxiliary pulse P2. If the number of cycles from the most recent cycle in which auxiliary pulse P2 output is within C cycles, it is assumed that a magnetic field or the effects of a residual magnetic field are present, and that magnetic field detection is still unreliable. Accordingly, detection of the magnetic field is not performed within C cycles from most recent auxiliary pulse P2, and short pulses, such as fast-forward and reverse pulses, are forcibly terminated in step ST42, and a driving pulse P1" is supplied in step ST43, which has a level that is several degrees greater in effective electric power than that of driving pulse P1 previously supplied, thereby ensuring the rotation of rotor 13. As a result, the rotation detection step may be omitted and errors in the movement of the hands are eliminated. Then, the system returns to step ST1 and conducts timing.

If the number of cycles from the output of the most recent auxiliary pulse P2 exceeds C cycles, magnetic field detecting pulse SP0 is used for detecting external high-frequency magnetic field in step ST2, and the detection of alternating current magnetic field is conducted for both pole sides in step ST23 and step ST24, respectively. Thus, the magnetic field generated by electricity generating device 40 can be easily detected. If a magnetic field is detected in steps, ST2, ST23 and ST24, rotation detection is unreliable so the system proceeds to step ST15 in which short pulse driving is stopped and then to ST7 in which auxiliary pulse P2, having a greater effective electrical power than driving pulse P1, is supplied.

If there is no detection of magnetic fields which might interfere with rotation detection, driving pulse P1 is output in step ST4 and, thereafter, rotation detecting pulse SP2 is output in step ST5 to determine whether rotor 13 rotated. If rotation of rotor 13 cannot be confirmed, auxiliary pulse P2, having a greater effective electrical power than driving pulse P1, is supplied in step ST7, thereby ensuring that rotor 13 rotates. Next, in step ST8, demagnetizing pulse PE is output and, thereafter, the level of driving pulse P1 is adjusted in step ST10, if necessary. If in step ST5, the rotation of rotor 13 by driving pulse P1 is confirmed, level adjustment is performed in step ST6 to lower the effective electric power of driving pulse P1, if the conditions are favorable.

Referring now to FIG. 9, there is shown a timing chart illustrating the operation of control device 20 according to the third embodiment. As with the second embodiment described in FIG. 7, FIG. 9 illustrates the control signals that are supplied to gates GP1, GN1, and GS1 of the p-channel MOSFET 33*a*, n-channel MOSFET 32*a*, and sampling p-channel MOSFET 34*a*, respectively, and to gates GP2, GN2, and GS2 of the p-channel MOSFET 33*b*, n-channel MOSFET 32*b*, and sampling p-channel MOSFET 34*b*, respectively, of driving circuit 30. Like elements to those described in FIG. 7 are denoted by the same reference numerals and a detailed description thereof is omitted.

After a certain amount of time (one second) elapses in step ST1, if, in step ST41, it is determined that C cycles have already elapsed from the last auxiliary pulse P2 supplied, operation proceeds to step ST 2 in which magnetic field detecting pulse SP0 is output at time t101 for detecting high-frequency noise magnetic field. Next, in steps ST23 and ST24, control signals for outputting magnetic field detecting pulses SP1 are supplied to the reverse pole side gate GP2 and driving pole side gate GP1 at time t102 and t103, respectively. If there is no detection of magnetic fields in these steps, driving pulse P1 of voltage V10 is supplied at time t104 in step ST4 and, then, in step ST5, rotation of rotor 13 is detected at time t105. If the driving rotor 13 was rotated, the system returns to step ST1 and conducts timing.

When the next cycle is started at time t111, high-frequency magnetic field detecting pulse SP0 is output as described above, and thereafter, alternating current magnetic field detecting pulse SP1 is output at time t112 on the reverse pole side and, at time t113, on the driving pole side. If a magnetic field is detected by magnetic field detecting pulse SP1, the system proceeds to step ST7, and auxiliary pulse P2, having a greater effective electrical power than driving pulse P1, is output at time t114. Thereafter, a demagnetizing pulse PE is output at time t115, thus completing the cycle.

When the next cycle starts at time t121, in step ST41, if, for example, C is set to 2, the present cycle is within C cycles from a cycle in which auxiliary pulse P2 was output. Accordingly, the system proceeds to step ST42, and the various magnetic field detecting steps are not performed. If fast-forward driving is being performed, this is forcibly terminated in step ST42. In the case of normal driving, driving pulse P1" is selected and output in step ST43, driving pulse P1" being of a level several degrees greater in effective electric power than that of driving pulse P1 which was supplied at time t104. In timing device 1 of the present embodiment, booster/reducer circuit 49 can be used to change the voltage of driving pulse P1. Accordingly, at time t121, driving pulse P1" having a voltage of V11 or greater (where V11>V10) is output if a magnetic field was detected. Thus, a highly reliable and accurate timing device 1 is provided without having to detect the presence of magnet noise or whether rotor 13 rotated.

The next cycle, which starts at time t131, is also within C cycles of the last auxiliary pulse P2 (for C=2). Accordingly, driving pulse P1" is output in step ST43 at time t131.

The next cycle, which starts at time t141, is beyond C cycles from the last auxiliary pulse P2. In this case, magnetic field detecting pulses SP0 and SP1 are output at times t141, t142, and t143, respectively, so as to detect whether a magnetic field is present. If a magnetic field is not detected, driving pulse P1, having an effective electrical power of voltage of V10 that is approximately equal to the effective electrical power of driving pulse P1 output at time t104, is output at time t144, and rotation detecting pulse SP2 is output at time t145. On the other hand, if a magnetic field is detected, auxiliary pulse P2 is output again, and driving pulse P1" of increased effective electrical power is output for the next two cycles.

Although FIG. 9 illustrates increasing the effective electrical power of driving pulse P1" by increasing its voltage, the effective electrical power may also be increased by increasing the pulse width of driving pulse P1". Alternatively, both voltage and pulse width characteristics may be used for controlling the effective electrical power of driving pulse P1", or driving pulse P1, P1", or auxiliary pulse P2 may be comprised of a plurality of sub-pulses with the effective electrical power controlled according to the duty ratio thereof. Further, the detection of magnetic fields may also be conducted at each cycle even following the output of auxiliary pulse P2 so that magnetic field detecting capabilities during electricity generation is increased.

Figure 10:
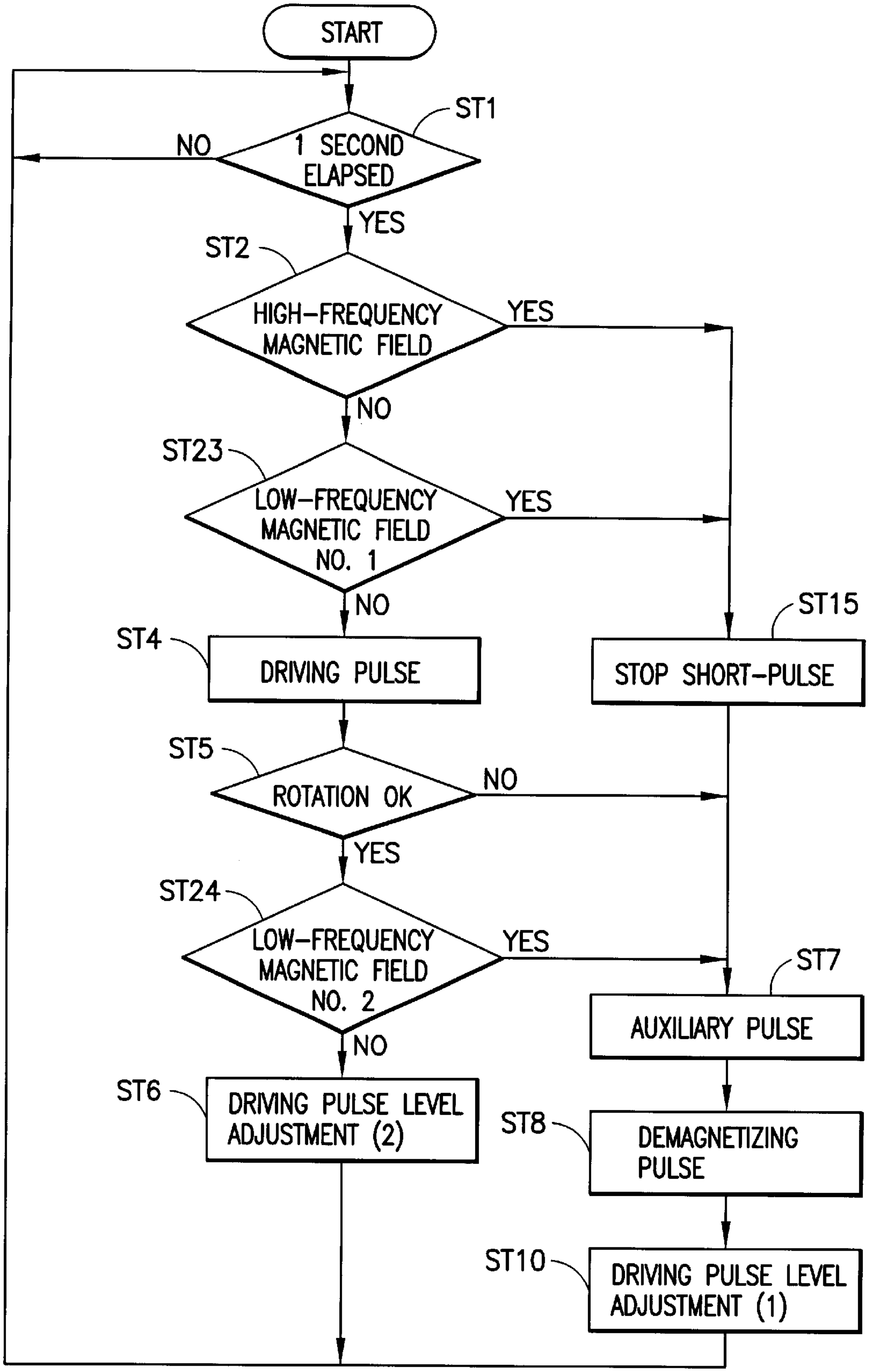
FIG. 10 is a flowchart illustrating the control method of the control device according to a fourth embodiment of the present invention.
Figure 11:
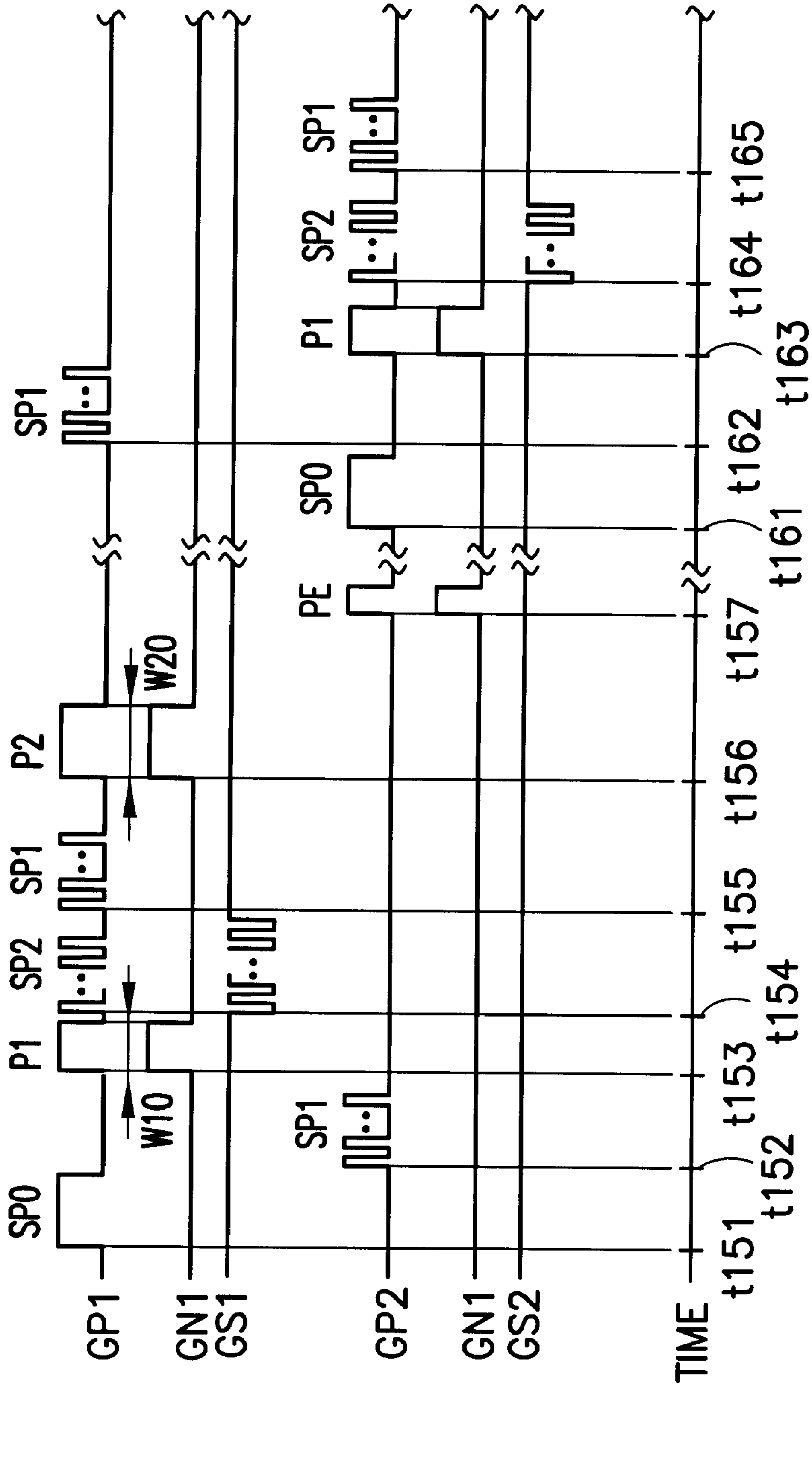
FIG. 11 is a timing chart illustrating the operation of the control device in accordance with the fourth embodiment of the invention.

Referring now to FIGS. 10–11, timing device 1 operating in accordance with a fourth embodiment will be described. Because timing device 1 of the fourth embodiment uses the same structure as the embodiment described in FIG. 1, a detailed description of the drawings will be omitted.

Control device 20 according to the fourth embodiment is constructed so as to further improve the reliability of detecting the magnetic fields generated by electricity generating device 40 which may be as little as 100 ms in duration. To accomplish this, magnetic field detecting pulse supplying unit 24*c* supplies magnetic field detecting pulses SP1 before driving pulse P1, and also supplies magnetic field detecting pulses SP1 again following rotation detecting pulse SP2. Furthermore, the polarity of the two magnetic field detecting pulses SP1 are changed in order to further improve the probability of detecting the presence of magnetic fields.

The flowchart of FIG. 10 depicts the method of controlling stepping motor 10 employed in the fourth embodiment. Flowchart steps that correspond to steps in previous embodiment are denoted by the same reference numerals, and detailed a description thereof will be omitted.

First, in step ST1, one second of time is measured for movement of the hands. Next, if one second has elapsed, magnetic field detecting pulse SP0 is used for determining whether external high-frequency magnetic fields are present in step ST2. If no field is present, a magnetic field detecting pulse SP1 is used for detecting external alternating current magnetic field (low-frequency noise) at one pole side in steps ST23, as described above. If a magnetic field is detected in steps ST2 or ST23, rotation detection of rotor 13 becomes unreliable, so the system proceeds to step ST15, in which short pulses such, as fast forward and reverse pulses, are forcibly terminated, and to step ST7, in which auxiliary pulse P2, having a greater effective electrical power than driving pulse P1, is supplied.

If no magnetic fields, which might interfere with rotation detection, are detected in these steps, driving pulse P1 is supplied in step ST4, and then, in step ST5, rotation detecting pulse SP2 is outputted to determine whether rotor 13 has rotated. If the rotation of rotor 13 cannot be confirmed, auxiliary pulse P2, having a greater effective electrical power than driving pulse P1, is supplied in step ST7, so that the rotation of rotor 13 is ensured. Thereafter, in step ST8, demagnetizing pulse PE is output, and in step ST10, the level of driving pulse P1 is adjusted, if necessary.

If the rotation of rotor 13, in response to driving pulse P1 is detected in step ST5, then in step ST24, magnetic field detecting pulse SP1 is output for detecting the presence of external alternating current magnetic fields (low-frequency magnetic fields) at the pole side that is opposite to the pole tested in step ST23. If an alternating current magnetic field is detected in step ST24, there is a high possibility that rotation detection was erroneous, so auxiliary pulse P2 is supplied in step ST7, as described in the previous embodiment. Thus, the probability of detecting the presence of a magnetic field is greatly improved by supplying magnetic field detecting pulses SP1 at two steps: before driving pulse P1 is output, and following rotation detecting pulse SP2.

Because electricity generating device 40 generates electricity in short, irregular bursts, even if no magnetic noise was detected before driving pulse P1 was supplied, magnetic noise may be present at the time when rotation detecting pulse SP2 is output. Accordingly, in the fourth embodiment magnetic noise is detected immediately after rotation detecting pulse SP2 is output as well, so that there is a high probability that magnetic fields will be detected thus making rotation detection highly reliable.

Referring now to FIG. 11, there is shown a timing chart illustrating the operation control device 20 according to the fourth embodiment. As with the previous embodiments described in FIGS. 7 and 9, FIG. 11 illustrates the control signals that are supplied to gates GP1, GN1, and GS1 of the p-channel MOSFET 33*a*, n-channel MOSFET 32*a*, and sampling p-channel MOSFET 34*a*, respectively, and to the gates GP2, GN2, and GS2 of the p-channel MOSFET 33*b*, n-channel MOSFET 32*b*, and sampling p-channel MOSFET 34*b*, respectively, of driving circuit 30. Like elements to those described in FIGS. 7 and 9 are denoted by the same reference numerals and a detailed description thereof is omitted.

After a certain amount of time (one second) elapses in step ST1, magnetic field detecting pulse SP0 used for detecting high-frequency noise magnetic fields is output at time t151. Next, in step ST23, a control signal, to output magnetic field detecting pulse SP1 for detecting alternating current magnetic fields is supplied to gate GP2 which is on the reverse pole side, and a magnetic field detecting pulse SP1 is output at time t152. If magnetic fields are not detected, driving pulse P1 having a pulse width W10 is supplied in step ST4 at time t153, and then, in step ST5, rotation detection of driving rotor 13 is performed at time t154. In this embodiment, following rotation detection, at time t155, a control signal to output a magnetic field detecting pulse SP1 for detecting alternating current magnetic fields is supplied in step ST24 to gate GP21 which is on the driving side, and the second detection of low-frequency magnetic field is performed. If a magnetic field is detected by the second magnetic field detecting pulse SP1, the system proceeds to step ST7, and auxiliary pulse P2, having a greater effective electric power than driving pulse P1, and having a pulse width of W20 (where W20>W10), is output at time t156, and thereafter at time t157, demagnetizing pulse PE is output.

When the next cycle is started at time t161, high-frequency magnetic field detecting pulse SP0 is output, as above, and thereafter, pulse SP1, for detecting alternating current magnetic fields, is output at time 162. If a magnetic field is not detected at this time, driving pulse P1 is supplied at time t163, and rotation detecting pulse SP2 is supplied at time t164. Afterwards, magnetic field detecting pulse SP1 is output for a second time at time t165 and, if a magnetic field is not detected at this time, the indication that rotation occurred in step ST5 is deemed reliable.

Also, in this embodiment, magnetic field detecting pulse SP1 for the reverse pole side is output before driving pulse P1, while magnetic field detecting pulse SP1 for the driving pole side is output following the rotation detecting pulse SP2, so as to facilitate magnetic noise detection on the side at which error easily occurs during rotation detection. Alternatively, magnetic field detecting pulse SP1 may be output to the driving pole side before driving pulse P1, and magnetic field detecting pulse SP1 maybe output to the reverse pole side following rotation detecting pulse P2. In yet another embodiment, magnetic field detecting pulses SP1 of different polarities may each be output before driving pulse P1, and then, following rotation detecting pulse SP2, magnetic field detecting pulses SP1 of either one polarity or two polarities may be output, thereby further increasing the probability of detecting a magnetic field.

As described above, timing device 1, constructed in accordance with the present invention, increases the probability of detecting the presence of a magnetic field so that magnetic fields generated by built-in electricity generating device 40 can be detected. This prevents the adverse effects of a magnetic field generated by electricity generating device 40, in addition to the effects of external magnetic fields from causing errors in the movement of the hands of timing device 1. Because it is assumed that a magnetic field is present during the generation of electricity, hand movements can be performed with high precision even though built-in electricity generating device 40 generates electricity, and thus magnetic noise, in short, irregular bursts. In this way, the precision of timing device 1 is vastly improved and can also be used without a battery.

The benefits of the present invention are not limited to timing devices, such as wristwatches or the like, but can also be provided for multiple-function timepieces such as chronographs or other generating devices, and also for devices and apparatuses having built-in stepping motors.

Also, the waveform of the pulses described above, i.e., driving pulse P1, auxiliary pulse P2, magnetic field detecting pulses SP0 and SP1, and rotation detecting pulse SP2, etc. are illustrated only as examples, and it goes without saying that the waveforms can be set according to the properties of stepping motor 10 employed in timing device 1. Also, in the above example, the present invention was described as having a two-phase stepping motor which is favored for use in timing devices 1, but it is needless to say that the present invention can be also applied to stepping motors having three-phases and higher, in the same manner. Also, instead of performing common control of each phase, the driving pulses may be provided at pulse widths and timing appropriate for each phase. Also, it is needless to say that the driving method of stepping motor 10 is by no means restricted to single-phase excitation, and may employ two-phase excitation or 1–2 phase excitation.

As described above, the control method and control device 20 according to the present invention increases the probability of magnetic field detection so that magnetic fields generated by electricity generating device 40 can be detected. Also, because it is assumed that a magnetic field is present during the generation of electricity, a driving pulse having a greater effective electric power than driving pulse P1, such as auxiliary pulse P2 is output. Accordingly, by using control device 20 and method of the present invention, the effects of a magnetic field from electricity generating device 40 stored in timing device 1, or a device having a stepping motor, can be greatly minimized thereby providing a highly accurate timing device 1 which can be used anytime and anywhere without batteries.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the aims.

What is claimed is:

1. A timepiece comprising a control device for a stepping motor, the stepping motor including a driving rotor rotatably driveable near a driving stator, the driving stator having a driving coil, an electricity generating device for generating electric power, said electricity generating device having an electricity generating rotor that rotates near an electricity generating stator for generating electricity, said electricity generating device being driven by kinetic energy transferring means, and an energy storing device for receiving the electric power and applying magnetic force to the driving rotor, said control device comprising:

driving means for supplying a plurality of driving pulses to said driving coil for driving said driving rotor, said driving pulses having an effective electric power;

magnetic field detecting means for supplying a plurality of magnetic field detection pulses for obtaining a magnetic field detecting induction voltage for detecting a magnetic field external to said stepping motor, said magnetic field detection pulse being supplied prior to said driving pulse; and wherein, prior to output of said driving pulse, said magnetic field detecting means supplies to said driving coil a first magnetic field detecting pulse having a first polarity and a second magnetic field detecting pulse having a second polarity for detecting magnetic fields of approximately the same frequency band.

2. The timepiece of claim 1, said control device further comprising a rotation detecting means for supplying a rotation detection pulse for obtaining a rotation detection induction voltage for detecting the rotation of said driving rotor, said rotation detection pulse being supplied following said driving pulse.

3. The timepiece of claim 2, said control device further comprising an evaluating means for comparing the rotation detecting induction voltage and the magnetic field detecting induction voltage with a first set value and a second set value, respectively, for evaluating whether said driving rotor rotated and whether said magnetic field is present.

4. The timepiece of claim 3, said control device further comprising an auxiliary means for supplying an auxiliary pulse having an effective electric power that is greater than said effective electric power of said driving pulse, said auxiliary pulse being output when rotation of said driving rotor, in response to output of said driving pulse, is not detected or when said external magnetic field has been detected.

5. A timepiece comprising a control device for a stepping motor, the stepping motor including a driving rotor rotatably driveable near a driving stator, the driving stator having a driving coil, an electricity generating device for generating electric power, said electricity generating device having an electricity generating rotor that rotates near an electricity generating stator for generating electricity, said electricity generating device being driven by kinetic energy transferring means, and a an energy storing device for receiving the electric power and applying magnetic force to the driving rotor, said control device comprising:

driving means for supplying a plurality of driving pulses to said driving coil for driving said driving rotor, said driving pulses having an effective electric power;

rotation detecting means for supplying a rotation detection pulse for obtaining a rotation detection induction voltage for detecting the rotation of said driving rotor, said rotation detection pulse being supplied following said driving pulse;

magnetic field detecting means for supplying a plurality of magnetic field detection pulses for obtaining a magnetic field detecting induction voltage for detecting a magnetic field external to said stepping motor, said magnetic field detection pulse being supplied prior to said driving pulse; and wherein said magnetic field detecting means supplies a first magnetic field detecting pulse to said driving coil prior to output of said driving pulse and a second magnetic field detecting pulse to said driving coil after output of said rotation detecting pulse.

6. The timepiece of claim 5, said control device further comprising an evaluating means for comparing the rotation detecting induction voltage and the magnetic field detecting induction voltage with a first set value and a second set value, respectively, for evaluating whether said driving rotor rotated and whether said magnetic field is present.

7. The timepiece of claim 6, said control device further comprising an auxiliary means for supplying an auxiliary pulse having an effective electric power that is greater than said effective electric power of said driving pulse, said auxiliary pulse being output when rotation of said driving rotor, in response to output of said driving pulse, is not detected or when said external magnetic field has been detected.

8. A timepiece comprising a control device for a stepping motor, the stepping motor including a driving rotor rotatably driveable near a driving stator, the driving stator having a driving coil, an electricity generating device for generating electric power, said electricity generating device having an electricity generating rotor that rotates near an electricity generating stator for generating electricity, said electricity generating device being driven by kinetic energy transferring means, and an energy storing device for storing a voltage charge and supplying an electric power to the driving rotor, said control device comprising:

magnetic field detecting means for supplying a plurality of magnetic field detection pulses for obtaining a magnetic field detecting induction voltage for detecting a magnetic field external to said stepping motor, said magnetic field detection pulse being supplied prior to said driving pulse;

evaluating means for comparing the magnetic field detecting induction voltage with a second set value for determining whether said magnetic field is present; and wherein said evaluating means adjusts said second set value used for evaluating said magnetic field detecting induction voltage based on said voltage charge stored in said condenser means.

9. The timepiece of claim 8, said control device further comprising a driving means for supplying a plurality of driving pulses to said driving coil for driving said driving rotor, said driving pulses having an effective electric power.

10. The timepiece of claim 9, said control device further comprising a rotation detecting means for supplying a rotation detection pulse for obtaining a rotation detection induction voltage for detecting the rotation of said driving rotor, said rotation detection pulse being supplied following said driving pulse.

11. The timepiece of claim 10, said control device further comprising an auxiliary means for supplying an auxiliary pulse having an effective electric power that is greater than said effective electric power of said driving pulse, said auxiliary pulse being output when rotation of said driving rotor, in response to output or said driving pulse, is not detected or when said external magnetic field has been detected.

12. The timepiece of claim 8, said control device further comprising an auxiliary means for supplying an auxiliary pulse having an effective electric power that is greater than said effective electric power of said driving pulse, said auxiliary pulse being output when rotation of said driving rotor, in response to output of said driving pulse, is not detected or when said external magnetic field has been detected.

13. A timepiece comprising a control device for a stepping motor, the stepping motor being driven by driving pulses via a driving coil, an electricity generating device for generating electric power, and causing a magnetic field during said generating of said electric power, said electric power to the control device, said control device comprising:

driving means for supplying a plurality of driving pulses to said driving coil for driving said stepping motor, said driving pulses having an effective electric power; and auxiliary means for supplying an auxiliary pulse having an effective electric power that is greater than said effective electric power of said driving pulse, and;

said auxiliary means providing said auxiliary pulse when said electricity generating device is generating the electric power.

14. A timepiece of claim 13, wherein said electricity generating device is driven by a kinetic energy transferring means.

15. A timepiece of claim 13, further comprising an energy storing device for receiving the electric power.

16. A timepiece comprising a control device for a stepping motor, the stepping motor including a driving rotor rotatably driveable near a driving stator, the driving stator having a driving coil, an electricity generating device for generating electric power, said electricity generating device having an electricity generating rotor that rotates near all electricity generating stator for generating electricity, said electricity generating device being driven by kinetic energy transferring means, and an energy storing device for receiving the electric power and applying magnetic force to the driving rotor, said control device comprising:

short-pulse supplying means for supplying a plurality of short-pulse pulses having a shorter cycle than said driving pulses to said driving coil;

wherein said short-pulse supplying means stops supplying said short-pulse when said generating device is generating electricity.

17. The timepiece of claim 16, said control device further comprising a driving means for supplying a plurality of driving pulses to said driving coil for driving said driving rotor, said driving pulses having an effective electric power.

18. The timepiece of claim 17, wherein said plurality of short-pulse pulses includes at least one of either a fast-forward pulse or a reverse pulse.

19. A timepiece comprising a control device for a stepping motor, the stepping motor including a driving rotor rotatably driveable near a driving stator, the driving stator having a driving coil, an electricity generating device for generating electric power, said electricity generating device having an electricity generating rotor that rotates near an electricity generating stator for generating electricity, said electricity generating device being driven by kinetic energy transferring means, and an energy storing device for receiving the electric power and applying magnetic force to the driving rotor, said control device comprising:

driving means for supplying a plurality of driving pulses to said driving coil for driving said driving rotor, said driving pulses having an effective electric power;

rotation detecting means for supplying a rotation detection pulse for obtaining a rotation detection induction voltage for detecting the rotation of said driving rotor, said rotation detection pulse being supplied following said driving pulse;

magnetic field detecting means for supplying a plurality of magnetic field detection pulses for obtaining a magnetic field detecting induction voltage for detecting a magnetic field external to said stepping motor, said magnetic field detection pulse being supplied prior to said driving pulse;

evaluating means for comparing the rotation detecting induction voltage and the magnetic field detecting induction voltage with a first set value and a second set value, respectively, for evaluating whether said driving rotor rotated and whether said magnetic field is present;

auxiliary means for supplying an auxiliary pulse having an effective electric power that is greater than said effective electric power of said driving pulse, said auxiliary pulse being output when rotation of said driving rotor, in response to output of said driving pulse, is not detected or when said external magnetic field has been detected; and wherein said driving means supplies said driving pulses having a plurality of effective electric powers, and at least one of said driving pulses has a greater effective electric power than the effective electric power of an immediately preceding one of said driving pulses, said at least one of said driving pulses being supplied after said auxiliary pulse is supplied.

20. The timepiece of claim 19, wherein said driving pulses have one of a plurality of pulse widths.

21. The timepiece of claim 19, wherein said driving pulses have one or a plurality of voltages.

22. A timepiece comprising a control device for a stepping motor, the stepping motor including a driving rotor rotatably driveable near a driving stator, the driving stator having a driving coil, an electricity generating device for generating electric power, said electricity generating device having an electricity generating rotor that rotates near an electricity generating stator for generating electricity, said electricity generating device being driven by kinetic energy transferring, means, and an energy storing device for receiving the electric power and applying magnetic force to the driving rotor, said control device comprising:

driving means for supplying a plurality of driving pulses to said driving coil for driving said driving rotor, said driving pulses having an effective electric power;

rotation detecting means for supplying a rotation detection pulse for obtaining a rotation detection induction voltage for detecting the rotation of said driving rotor, said rotation detection pulse being supplied following said driving pulse;

magnetic field detecting means for supplying a plurality of magnetic field detection pulses for obtaining a magnetic field detecting induction voltage for detecting a magnetic field external to said stepping motor, said magnetic field detection pulse being supplied prior to said driving pulse;

evaluating means for comparing the rotation detecting induction voltage and the magnetic field detecting induction voltage with a first set value and a second set value, respectively, for evaluating whether said driving rotor rotated and whether said magnetic field is present;

auxiliary means for supplying an auxiliary pulse having an effective electric power that is greater than said effective electric power of said driving pulses, said auxiliary pulse being output when rotation of said driving rotor, in response to outlet of said driving pulse, is not detected or when said external magnetic field has been detected, said auxiliary pulse having a polarity; and demagnetizing means for providing a demagnetizing pulse having a polarity that is different than said polarity of said auxiliary pulse, said demagnetizing pulse being output after said auxiliary pulse for demagnetizing said driving coil; and wherein a following driving pulse is output following said auxiliary pulse, and said demagnetizing pulse is output immediately prior to said following driving pulse.

23. A control method for a timepiece having a stepper motor, the stepping motor including a driving rotor rotatably driveable near a driving stator, the driving stator having a driving coil, an electricity generating device for generating electric power, said electricity generating device having an electricity generating rotor that rotates near an electricity generating stator for generating electricity, said electricity generating device being driven by kinetic energy transferring means, and an energy storing device for receiving the electric power and applying magnetic force to the driving rotor, said control method comprising the steps of:

supplying a plurality of driving pulses to said driving coil for driving said driving rotor, said driving pulse having an effective electric power;

outputting a rotation detection pulse to said driving coil following output of said driving pulse for obtaining a rotation detection induction voltage;

comparing said rotation detection induction voltage with a first set value;

determining whether said driving rotor rotated;

outputting a plurality of magnetic field detection pulses having a plurality of polarities to said driving coil for obtaining a plurality of magnetic field detection induction voltages, said magnetic field detection pulses being output prior to said driving pulse;

comparing said plurality of magnetic field detection induction voltages individually with a second set value for detecting the presence of magnetic fields of approximately the same frequency band; and supplying an auxiliary pulse having an effective electric power that is greater than said effective power of said driving pulse, said auxiliary pulse being supplied when rotation of said driving rotor in response to output of said driving pulse is not detected or when said external magnetic field has been detected.

24. A control method for a timepiece having a stepping motor, the stepping motor including a driving rotor rotatably driveable near a driving stator, the driving stator having a driving coil, an electricity generating device for generating electric power, said electricity generating device having an electricity generating rotor that rotates near an electricity generating stator for generating electricity, said electricity generating device being driven by kinetic energy transferring means, an energy storing device for receiving the electric power and applying magnetic force to the driving rotor, said control method comprising the steps:

supplying a plurality of driving pulses to said driving coil for driving said driving rotor, said driving pulse having an effective electric power;

outputting a rotation detection pulse to said driving coil following output of said driving pulse for obtaining a rotation detection induction voltage;

comparing said rotation detection induction voltage with a first set value;

determining whether said driving rotor rotated;

outputting a first magnetic field detection pulse to said driving coil for obtaining a first magnetic field detection induction voltage, said first magnetic field detection pulse being output prior to said driving pulse;

comparing said first magnetic field detection induction voltage with a second set value for detecting the presence of a magnetic field;

outputting a second magnetic field detection pulse to said driving coil for obtaining a second magnetic field detection induction voltage, said second magnetic field detection pulse being output following said rotation detecting pulse;

comparing said second magnetic field induction voltage with said second set value for detecting the presence of said magnetic field; and supplying an auxiliary pulse leaving an effective electric power that is greater than said effective power of said driving pulse, said auxiliary pulse being supplied when rotation of said driving rotor, in response to output of said driving pulse, is not detected or when said external magnetic field has been detected.

25. A control method for a timepiece having a stepping motor, the stepping motor including a driving rotor rotatably driveable near a driving stator, the driving stator having a driving coil, an electricity generating device for generating electric power, said electricity generating device having an electricity generating rotor that rotates near an electricity generating stator for generating electricity, said electricity generating device being driven by kinetic energy transferring means, and an energy storing device for receiving the electric power and applying magnetic force to the driving rotor, said control method comprising the steps:

supplying a plurality of driving pulses to said driving coil for driving said driving rotor, said driving pulse having an effective electric power;

outputting a rotation detection pulse to said driving coil following output of said driving pulse for obtaining a rotation detection induction voltage;

comparing said rotation detection induction voltage with a first set value;

determining whether said driving rotor rotated;

outputting a magnetic field detection pulse to said driving coil for obtaining a magnetic field detection induction voltage, said magnetic field detection pulse being output prior to said driving pulse;

adjusting a second set value according to a voltage charge of said energy storing device;

comparing said magnetic field detection induction voltage with said second set value for detecting the presence of a magnetic field; and supplying an auxiliary pulse having an effective electric power that is greater than said effective power of said driving pulse, said auxiliary pulse being supplied when rotation of said driving rotor, in response to output of said driving pulse, is not detected or when said external magnetic field has been detected.

26. A control method for a timepiece having a stepping motor, the stepping motor including a driving coil, an electricity generating device for generating electric power and causing a magnetic field during said generating of electric power, said electricity generating device having an electricity generating rotor that rotates near an electricity generating coil for generating electric power and applying said electrical power to the control device, said control method comprising the steps of:

supplying a plurality of driving pulses to said driving coil for driving said stepping motor, said driving pulse having an effective electric power; and supplying an auxiliary pulse having an effective electric power that is greater than said effective electric power of said driving pulse, said auxiliary pulse being supplied when said electric generating device is generating electric power.

27. The control method for a timepiece of claim 26, wherein said electricity generating device is driven by a kinetic energy transferring unit.

28. The control method for a timepiece of claim 26, wherein the timepiece has an energy storing device for receiving the electric power.

29. A control method for a timepiece having a stepping motor, the stepping motor including a driving rotor rotatably driveable near a driving stator, the driving stator having a driving coil, an electricity generating device for generating electric power, said electricity generating device having an electricity generating rotor that rotates near an electricity generating stator for generating electricity, said electricity generating device being driven by kinetic energy transferring means, and an energy storing device for receiving the electric power and applying magnetic force to the driving rotor, said control method comprising the steps of:

supplying a plurality of driving pulses to said driving coil for driving said driving rotor, said driving pulses having a cycle;

supplying to said driving coil a plurality of short-pulse pulses having a cycle that is shorter than said cycle of said driving pulses; and terminating output of said plurality of short-pulse pulses when said generating device is generating electricity.

30. The control method for a timepiece of claim 29, wherein said plurality of short-pulse pulses includes at least one of either a fast-forward pulse or a reverse pulse.

31. A control method for a time piece having a stepping motor, the stepping motor including a driving rotor rotatably driveable near a driving stator, the driving stator having a driving coil, an electricity generating device for generating electric power, said electricity generating device having an electricity generating rotor that rotates near an electricity generating stator for generating electricity, said electricity generating device being driven by kinetic energy transferring means, and an energy storing device for receiving the electric power and applying magnetic force to the driving rotor, said control method comprising the steps of:

supplying a plurality of driving pulses to said driving coil for driving said driving rotor, said driving pulse having an effective electric power;

outputting a rotation detection pulse to said driving coil following output of said driving pulse for obtaining a rotation detection induction voltage;

comparing said rotation detection induction voltage with a first set value;

determining whether said driving rotor rotated;

outputting a magnetic field detection pulse to said driving coil for obtaining a magnetic field detection induction voltage, said magnetic field detection pulse being output prior to said driving pulse;

comparing said magnetic field detection induction voltage with a second set value for detecting the presence of a magnetic field;

supplying an auxiliary pulse having an effective electric power that is greater than said effective power of said driving pulse, said auxiliary pulse being supplied when rotation of said driving rotor in response to output of said driving pulse is not detected or when said external magnetic field has been detected; and supplying at least one of said driving pulses having a greater effective electric power than the effective electric power of an immediately preceding one of said driving pulse, said at least one of said driving pulses being supplied after said auxiliary pulse being supplied.

32. The control method for a timepiece of claim 31, wherein supplying at least one of said driving pulses step includes supplying said at least one of said driving pulses having different pulse widths.

33. The control method for a timepiece of claim 31, wherein supplying at least one of said driving pulses step includes supplying said at least one of said driving pulses driving pulses having different pulse voltages.

34. A control method for a timepiece having a stepping motor, the stepping motor including a driving rotor rotatably driveable near a driving stator, the driving stator having a driving coil, an electricity generating device for generating electric power, said electricity generating device having an electricity generating rotor that rotates near an electricity generating stator for generating electricity, said electricity generating device being driven by kinetic energy transferring means, and an energy storing device for receiving the electric power and applying magnetic force to the driving rotor, said method device comprising the steps of:

supplying a plurality of driving pulses to said driving coil for driving said driving rotor;

outputting a rotation detection pulse to said driving coil following output of said driving pulse for obtaining a rotation detection induction voltage;

comparing said rotation detection induction voltage with a first set value;

determining whether said driving rotor rotated;

outputting a magnetic field detection pulse to said driving coil for obtaining a magnetic field detection induction voltage, said magnetic field detection pulse being output prior to said driving pulse;

comparing said magnetic field detection induction voltage with a second set value for detecting the presence of a magnetic field;

supplying an auxiliary pulse having an effective electric power that is greater than said effective power of said driving pulse, said auxiliary pulse being supplied when rotation of said driving rotor, in response to output of said driving pulse, is not detected or when said external magnetic field has been detected, said auxiliary pulse having a polarity;

providing a demagnetizing pulse having a polarity that is different than said polarity of said auxiliary pulse, said demagnetizing pulse being output after said auxiliary pulse for demagnetizing said driving coil; and supplying a following driving pulse immediately after said demagnetizing pulse, said following driving pulse being output following said auxiliary pulse.

35. A timepiece comprising a control device, said control device having a stepping motor, the stepping motor including a driving coil, said stepping motor being driven by driving pulses via said driving coil, an electricity generating device for generating electric power, and causing a magnetic field during said generating of said electric power, said electricity generating device being driven by a kinetic energy transferring unit, and an energy storing device for receiving the electric power and applying said electric power to die control device, said control device comprising:

a drive pulse supply unit coupled to said driving coil and supplying a plurality of driving pulses to said driving coil for driving said stepping motor, said driving pulses having an effective electric power;

a magnetic field pulse supplying unit coupled to said driving coil and supplying a plurality of magnetic field detection pulses for obtaining a magnetic field detecting induction voltage for detecting a magnetic field external to said stepping motor, a magnetic field detection pulse being supplied prior to said driving pulse; and wherein, prior to output of said driving pulse, said magnetic field pulse supplying unit supplies to said driving coil a first magnetic field detecting pulse having a first polarity and a second magnetic field detecting pulse having a second polarity for detecting magnetic fields of approximately the same frequency band.

36. The timepiece of claim 35 further comprising a rotation detecting pulse supplying unit coupled to said driving coil and supplying a rotation detection pulse for obtaining a rotation detection induction voltage for detecting the rotation of said stepping motor, said rotation detection pulse being supplied following said driving pulse.

37. The timepiece of claim 36 further comprising a detecting circuit coupled to said driving coil for comparing the rotation detecting induction voltage and the magnetic field detecting induction voltage with a first set value and a second set value, respectively, for evaluating whether said stepping motor rotated and whether said magnetic field is present.

38. The timepiece of claim 37 further comprising an auxiliary pulse supplying unit connected to said driving coil for supplying an auxiliary pulse having at effective electric power that is greater than said effective electric power of said driving pulse, said auxiliary pulse being output when rotation of said stepping motor in response to output of said driving pulse is not detected or when said external magnetic field has been detected.

39. A timepiece comprising a control device for a stepping motor, the stepping motor including a driving coil, said stepping motor being driven by driving pulses via said driving coil, an electricity generating device for generating electric power and causing a magnetic field during said generating of electric power, said electricity generating device being driven by a kinetic energy transferring unit, and an energy storing device for receiving the electric power and applying said electric power to the control device, said control device comprising:

a drive pulse supply unit coupled to said driving coil, said drive pulse supply unit supplying a plurality of driving pulses to said driving coil for driving said stepping motor, said driving pulses having an effective electric power;

a rotation detecting pulse supplying unit coupled to said driving coil and supplying a rotation detection pulse for obtaining a rotation detection induction voltage for detecting the rotation of said driving rotor, said rotation detection pulse being supplied following said driving pulse; and magnetic field pulse supplying unit coupled to said driving coil and supplying a plurality of magnetic field detection pulses for obtaining a magnetic field detecting induction voltage for detecting a magnetic field external to said stepping motor, a magnetic field detection pulse being supplied prior to said driving pulse;

wherein said magnetic field pulse supplying unit supplies a first magnetic field detecting pulse to said driving coil prior to output of said driving pulse and a second magnetic field detecting pulse to said driving coil after output of said rotation detecting pulse.

40. The timepiece of claim 39 further comprising a detecting circuit coupled to said driving coil for comparing the rotation detecting induction voltage and the magnetic field detecting induction voltage with a first set value and a second set value, respectively, for evaluating whether said stepping motor rotated and whether said magnetic field is present.

41. The timepiece of claim 40 further comprising an auxiliary pulse supplying unit coupled to said driving coil for supplying an auxiliary pulse having an effective electric power that is greater than said effective electric power of said driving pulse, said auxiliary pulse being output when rotation of said stepping motor in response to output of said driving pulse, is not detected or when said external magnetic field has been detected.

42. A timepiece comprising a control device for a stepping motor, the stepping motor including a driving coil, said stepping motor being driven by driving pulses via said driving coil, an electricity generating device for generating electric power and causing a magnetic field during said generating of electric power, said electricity generating device being driven by a kinetic energy transferring unit, and an energy storing device for storing a voltage charge and supplying an electric power to the stepping motor, said control device comprising:

a magnetic field pulse supplying unit coupled to said driving coil unit and supplying a plurality of magnetic field detection pulses for obtaining a magnetic field detecting induction voltage for detecting a magnetic field external to said stepping motor, a magnetic field detection pulse being supplied prior to said driving pulse; and a detecting circuit coupled to said driving coil and comparing the magnetic field detecting induction voltage with a second set value for determining whether said magnetic field is present;

wherein said detecting circuit adjusts said second set value used for evaluating said magnetic field detecting induction voltage based on said voltage charge stored in said energy storing device.

43. The timepiece of claim 42 further comprising a drive pulse supply unit coupled to said driving coil and supplying a plurality of driving pulses to said driving coil for driving said stepping motor, said driving pulses having an effective electric power.

44. The timepiece of claim 43 further comprising a rotation detecting pulse supplying unit coupled to said driving coil and supplying a rotation detection pulse for obtaining a rotation detection induction voltage for detecting the rotation of said stepping motor, said rotation detection pulse being supplied following said driving pulse.

45. The timepiece of claim 44 further comprising an auxiliary pulse supplying unit connected to said driving coil and supplying an auxiliary pulse having an effective electric power that is greater than said effective electric power of said driving pulse, said auxiliary pulse being output when rotation of said stepping motor, in response to output of said driving pulse, is not detected or when said external magnetic field has been detected.

46. The timepiece of claim 45 further comprising an auxiliary pulse supplying unit connected to said driving coil and supplying an auxiliary pulse having an effective electric power that is greater than said effective electric power of said driving pulse, said auxiliary pulse being output when rotation of said stepping motor in response to output of said driving pulse, is not detected or when said external magnetic field has been detected.

47. A timepiece comprising a control device for a stepping motor, the stepping motor including a driving coil, said stepping motor being driven by driving pulses via said driving coil, an electricity generating device for generating electric power and causing a magnetic field during said generating of said electric power, and applying said electric power to the control device, said control device comprising:

a drive pulse supply unit coupled to said driving coil and supplying a plurality of driving pulses to said driving coil for driving said stepping motor, said driving pulses having an effective electric power; and an auxiliary pulse supplying unit connected to said driving coil and supplying an auxiliary pulse having an effective electric power that is greater than said effective electric power of said driving pulse;

said auxiliary pulse supplying unit providing said auxiliary pulse when said electricity generating device is generating the electric power.

48. The timepiece of claim 47, wherein said electricity generating device is driven by a kinetic energy transferring unit.

49. The timepiece of claim 47, further comprising an energy storing device for receiving the electric power.

50. A timepiece having a stepping motor, the stepping motor including a driving coil, said stepping motor being driven by driving pulses via said driving coil, an electricity generating device for generating electric power and causing a magnetic field during said generating of said electric power, said electricity generating device being driven by a kinetic energy transferring unit, and an energy storing device for receiving the electric power and applying said electric power to the control device, said control device comprising:

a short-pulse supplying unit connected to said driving coil and supplying a plurality of short-pulse pulses having a shorter cycle than said driving pulses to said driving coil;

wherein said short-pulse supplying unit stops supplying said short-pulse when said generating device is generating electricity.

51. The timepiece of claim 50 further comprising a drive pulse supply unit coupled to said driving coil and supplying a plurality of driving pulses to said driving coil for driving said stepping motor, said driving pulses having an effective electric power.

52. The timepiece of claim 50, wherein said plurality of short-pulse pulses includes at least one of either a fast-forward pulse or a reverse pulse.

53. A timepiece comprising a control device for a stepping motor, the stepping motor including a driving rotor rotatably driveable near a driving stator, the driving stator having a driving coil, an electricity generating device for generating electric power, said electricity generating device having an electricity generating rotor that rotates near an electricity generating stator for generating electricity, said electricity generating device being driven by a kinetic energy transfer unit, and an energy storing device for receiving the electric power and applying magnetic force to the driving rotor, said control device comprising:

a driver to supply a plurality of driving pulses to said driving coil for driving said driving rotor, said driving pulses having an effective electric power;

a rotation detector to supply a rotation detection pulse for obtaining a rotation detection induction voltage for detecting the rotation of said driving rotor, said rotation detection pulse being supplied following said driving pulse;

a magnetic field detector to supply a plurality of magnetic field detection pulses for obtaining a magnetic field detecting induction voltage for detecting a magnetic field external to said stepping motor, said magnetic field detection pulse being supplied prior to said driving pulse;

an evaluator to compare the rotation detecting induction voltage and the magnetic field detecting induction voltage with a first set value and a second set value, respectively, for evaluating whether said driving rotor rotated and whether said magnetic field is present;

an auxiliary pulse supplier to supply an auxiliary pulse having an effective electric power that is greater than said effective electric power of said driving pulse, said auxiliary pulse being output when rotation of said driving rotor, in response to output of said driving pulse, is not detected or when said external magnetic field has been detected; and wherein said driver supplies said driving pulses having a plurality of effective electric powers, and at least one of said driving pulses has a greater effective electric power than the effective electric power of an immediately preceding one of said driving pulses, said at least one of said driving pulses being supplied after said auxiliary pulse is supplied.

54. A timepiece comprising a control device for a stepping motor, the stepping motor including a driving rotor rotatably driveable near a driving stator, the driving stator having a driving coil, an electricity generating device for generating electric power, said electricity generating device having an electricity generating rotor that rotates near an electricity generating stator for generating electricity, said electricity generating device being driven by a kinetic energy transferring unit, and an energy storing device for receiving the electric power and applying magnetic force to the driving rotor, said control device comprising:

a driver to supply a plurality of driving pulses to said driving coil for driving said driving rotor, said driving pulses having an effective electric power;

a rotation detector to supply a rotation detection pulse for obtaining a rotation detection induction voltage for detecting the rotation of said driving rotor, said rotation detection pulse being supplied following said driving pulse;

a magnetic field detector to supply a plurality of magnetic field detection pulses for obtaining a magnetic field detecting induction voltage for detecting a magnetic field external to said stepping motor, said magnetic field detection pulse being supplied prior to said driving pulse;

an evaluator to compare the rotation detecting induction voltage and the magnetic field detecting induction voltage with a first set value and a second set value, respectively, for evaluating whether said driving rotor rotated and whether said magnetic field is present;

an auxiliary pulse supplier to supply an auxiliary pulse having an effective electric power that is greater than said effective electric power of said driving pulse, said auxiliary pulse being output when rotation of said driving rotor, in response to output of said driving pulse, is not detected or when said external magnetic field has been detected, said auxiliary pulse having a polarity; and a demagnetizer to provide a demagnetizing pulse having a polarity that is different than said polarity of said auxiliary pulse, said demagnetizing pulse being output after said auxiliary pulse for demagnetizing said driving coil; and wherein a following driving pulse is output following said auxiliary pulse, and said demagnetizing pulse is output immediately prior to said following driving pulse.

* * * * *